United States Patent
Rodinger et al.

(10) Patent No.: US 12,107,701 B2
(45) Date of Patent: Oct. 1, 2024

(54) SYSTEMS AND METHODS FOR AUTOMATED CONTROL OF ELECTRONIC DEVICES ON BASIS OF BEHAVIOR

(71) Applicant: Nanogrid Limited, Kowloon (CN)

(72) Inventors: Tomas Rodinger, Vancouver (CA); Nathan Dyck, Toronto (CA); Gimmy Chu, Toronto (CA); Aliakbar Juzer Eski, Mississauga (CA); Douglas Rocha Ferraz, Toronto (CA); Gvarami Labartkava, North York (CA)

(73) Assignee: Nanogrid Limited, Kowloon (CN)

( * ) Notice: Subject to any disclaimer, the term of this patent is extended or adjusted under 35 U.S.C. 154(b) by 52 days.

(21) Appl. No.: 17/631,850

(22) PCT Filed: Jul. 31, 2020

(86) PCT No.: PCT/IB2020/057298
§ 371 (c)(1),
(2) Date: Jan. 31, 2022

(87) PCT Pub. No.: WO2021/019519
PCT Pub. Date: Feb. 4, 2021

(65) Prior Publication Data
US 2022/0286315 A1   Sep. 8, 2022

Related U.S. Application Data

(60) Provisional application No. 62/881,084, filed on Jul. 31, 2019.

(51) Int. Cl.
*H04L 12/70* (2013.01)
*G05B 19/042* (2006.01)
(Continued)

(52) U.S. Cl.
CPC .......... *H04L 12/282* (2013.01); *G05B 19/042* (2013.01); *G05B 2219/2642* (2013.01); *H04L 2012/285* (2013.01)

(58) Field of Classification Search
CPC .......... H04L 12/282; H04L 2012/285; G05B 19/042; G05B 2219/2642; G05B 15/02
(Continued)

(56) References Cited

U.S. PATENT DOCUMENTS 6,049,632 A * 4/2000 Cockshott ............ H04N 19/105
 375/E7.13
11,016,468 B1 * 5/2021 Barker ..................... G07C 3/08
(Continued)

FOREIGN PATENT DOCUMENTS

| CN | 205883657 U | 1/2017 |
|---|---|---|
| CN | 107430679 A | 12/2017 |

(Continued)

OTHER PUBLICATIONS

International Searching Authority, International Search Report, PCT Application No. PCT/IB2002/057298, dated Nov. 19, 2020, CN.
(Continued)

*Primary Examiner* — El Hadji M Sall
*Assistant Examiner* — Elizabeth Kassa
(74) *Attorney, Agent, or Firm* — Reichel Stohry Dean LLP; Natalie J. Dean; Mark C. Reichel

(57) ABSTRACT

Improved systems are directed to electronic devices that operate in conjunction with a control mechanism and various sensors. A learning protocol is established to provide a technical solution whereby sensor signal from the various sensors is utilized to implement an incremental approach to using sensed information. The electronic devices can be luminaires, and the control mechanism a lighting control mechanism. The sensing, for example, can include sensory
(Continued)

information from at least one remote sensing device and at least one local sensing device to control changes in operation of one or more connected electronic devices.

19 Claims, 20 Drawing Sheets

(51) Int. Cl.
*H04L 12/28* (2006.01)
*H04L 41/0806* (2022.01)
*H04L 67/12* (2022.01)
*H04W 48/08* (2009.01)

(58) Field of Classification Search
USPC .......................................................... 709/220
See application file for complete search history.

(56) References Cited

U.S. PATENT DOCUMENTS

| | | | | |
|---|---|---|---|---|
| 2013/0103207 A1* | 4/2013 | Ruff | ..................... | G01K 1/02 |
| | | | | 700/278 |
| 2013/0226320 A1* | 8/2013 | Berg-Sonne | ....... | G06Q 10/0631 |
| | | | | 700/90 |
| 2014/0058567 A1* | 2/2014 | Matsuoka | ............. | G05B 15/02 |
| | | | | 700/276 |
| 2014/0258474 A1* | 9/2014 | Kim | ........................ | H04W 4/70 |
| | | | | 709/219 |
| 2017/0108236 A1* | 4/2017 | Guan | .................... | G05B 19/042 |
| 2017/0282039 A1* | 10/2017 | Meredith | ............ | A63B 71/0622 |

FOREIGN PATENT DOCUMENTS

| | | | |
|---|---|---|---|
| CN | 110689041 A | 1/2020 | |
| CN | 210958917 U | 7/2020 | |
| WO | 2011097449 A2 | 8/2011 | |
| WO | WO-2017181291 A1 * | 10/2017 | ............. F21S 2/005 |

OTHER PUBLICATIONS

International Searching Authority, Written Opinion, PCT Application No. PCT/IB2002/057298, dated Nov. 19, 2020, CN.

European Patent Office, Supplementary European Search Report for EP 20 84 6437, dated Sep. 5, 2023, DE.

* cited by examiner time →

(a) W2;W2,S4;S2,S4;W4,W3

(b) W+2;W+2,S-4;S+2,S+4;W+4,W-3

(c) Wa3;Wb2,Sc4;Sb2,Sa4;Wa4,Wd3

(d) W2;W2,S4;S2,S4;W4,W3;delay200;S3

FIG. 5

SYSTEMS AND METHODS FOR AUTOMATED CONTROL OF ELECTRONIC DEVICES ON BASIS OF BEHAVIOR

CROSS-REFERENCE TO RELATED APPLICATIONS

This application is related to, claims the priority benefit of, and is a 35 U.S.C. 371 national stage application of International Patent Application Serial No. PCT/CA2020/051468 filed Oct. 30, 2020, which is a non-provisional of, and claims all benefit, including priority to, U.S. Application No. 62/881,084, entitled "SYSTEMS AND METHODS FOR AUTOMATED LIGHTING CONTROL", filed Jul. 31, 2019. The entire contents of each of the aforementioned priority applications are hereby expressly incorporated herein by reference in their entireties.

FIELD

Embodiments described herein relate to the fields of home or other facility device automation, and particularly to approaches for automating lighting or other smart devices based on detected stimuli and behavior.

INTRODUCTION

In many situations, automated lights and other devices for the home are desirable. A challenge with existing systems to operate devices, such as lighting, electrically powered home appliances, and indoor climate control apparatuses, is that the control efforts are predominately manual, where individuals are actively toggling switches or dials. Even for systems with automation, the automation is inconvenient, rudimentary in what the automation controls, and some systems rely on data inputs that are inimical to privacy of the individuals. Without automation, the manual effort of activating electronic devices can be tedious and cumbersome.

SUMMARY

A technical approach is described in various embodiments adapted to provide automatically controlled operation of one or more electronic devices. The one or more electronic devices can be lighting devices, in some embodiments, but are not necessarily limited. For example, the one or more electronic devices can include smart thermostats, door locks, automated window coverings, coffee makers, among others. The automatic operation is conducted in concert or in conjunction with one or more complementarily operating sensors, whose sensor signals are represented in the form of sensor data arrays that can be periodically or continuously updated as new sensory information is received. Specific approaches for controlling automatic operation are described in various embodiments herein, and various examples are described to illustrate potential implementation variations that are possible.

The sensor data arrays are utilized for automated comparisons (e.g., evaluations) to reference data arrays to determine whether one or more conditions are triggered. If the one or more conditions are triggered, the operation of the electronic devices are modified.

In a non-limiting example, the sensors can include motion sensors, and the electronic devices are controllable luminaires. The sensors and electronic devices operate in a location, such as an office, a room in a house, etc. As described herein, as an individual traverses from room to room, or different positions within a room, the individual's movements are tracked by the various sensors. Different levels of actuation are possible in respect of the sensors, for example, the sensors could be configured to track a "strong" actuation where the individual is prominently tracked by the sensor (e.g., above a particular threshold or within a particular distance), or a "weak" actuation where the individual is only tracked in a passing manner by the sensor (e.g., above a first threshold but below a second threshold, or within a further distance).

A controller hub or controller device can include or be coupled to one or more computer processors, and can be coupled to the sensors and the electronic devices over various networking interfaces and communication pathways. In one embodiment, a plurality of electronic devices are connected across a first communication network, while a plurality of sensors are connected across a second communication network, and the controller hub is coupled to both for communications. In another embodiment, both the plurality of electronic devices and the plurality of sensors are connected across the same communication network and the controller hub is similarly connected.

The controller hub or controller device can be practically implemented as a separate device that is coupled to the electronic devices and the sensors, or in a variant embodiment, the controller hub resides within or is integrated with one or more of the electronic devices and the sensors. In a further embodiment, a dormant controller hub or controller device resides in a number of (or all of) of the electronic devices and the sensors and can be activated for usage in controlling one or more electronic devices. In yet another further embodiment, if there are more than one controller hub or controller devices, on-board processing, memory, and control resources may be shared as between controller hub or controller devices.

The reference data arrays can be established, for example, through tracked patterns of the individual's voluntarily controlled actions in respect of electronic device control. For example, the individual may utilize a mobile application, provide voice commands, control the activation of various physical or virtual switches. When these voluntary activations occur, they can be tracked in the form of reference data arrays and associated with the tracked sensor activations that are temporally proximate to when the voluntary actions took place.

These tracked patterns, in the context of a non-limiting lighting example, can include the activation of various lights (e.g., dimming, increasing light levels, turn off, turn on), and the sensed movements can be tracked in the form of sensor data arrays. Reference templates can be established, for example, when a learning mode or state is being tracked by the controller hub or controller device.

During a non-learning mode or learning state (e.g., an automated operation state), the lighting can be automatically triggered and controlled where the sensors track similar (not necessarily the same) patterns of sensed information such that the activation of various lights can be automated. Similar variations are possible in non-lighting contexts, such as environmental or climate control, etc., and the sensors are not limited to only motion sensors. For example, there may be a sensor tracking a particular time, or amount of ambient light from the outdoors, etc.

Accordingly, the proposed approaches are useful in addressing some of the technical deficiencies of manual approaches, whereby an individual would have to manually control electronic devices individually despite having a routine. The proposed approaches are adapted such that a level of deviation is tolerated as despite having a routine, the individual may vary somewhat in the particular activities taken (e.g., an individual need not take the same exact path and trigger the sensors exactly the same way every time). An overly rigid system would not be usable, and similarly, an overly flexible system would activate during situations where it should not operate.

A specific technological solution is described in some embodiments that is adapted to identify and learn activation flows in association with sensed information, and then deploy those activation flows such that a technical, automated solution is provided for controlling the electronic devices in similar scenarios such that the individual is able to train the system in accordance with the individual's preference, without requiring the need for repeated manual activations.

In the lighting example, the system, can be adapted to associate activities with sensed movements for activations associated with morning routines after they have been learned through automatic observation of electronic device activation (e.g., one the system is trained, individual wakes up around 6 AM-8 AM, weakly triggers a sensor in a bedroom, walks through a corridor at a particular speed that strongly triggers a sensor in the corridor, and a closet light automatically is triggered so that the individual is better able to select the clothes for the day.

When the individual is exiting the door on the way to an office, a strong activation of a door sensor triggers the turning off of the closet light). Activation of the electronic devices (in this case, lighting elements) can include higher level object-oriented commands, such as command messages to be transmitted in accordance with a protocol through an application programming interface (API), or lower level command messages, such as controlling voltages/electrical current values to be supplied to various devices (e.g., to cause a dimming or a brightening effect directly). More complicated examples are possible.

The automated control of electronic devices in accordance with various embodiments herein is a directed to solve specific technical problems associated with device automation and an unconventional technological solution is described that is directed to practical implementation of an automated control system and corresponding methods.

Specific data structures are maintained and constructed to track the sensor inputs during learning states and automated control states. Predicted future sensor arrays are generated in some embodiments to generate operational data arrays which are adapted for controlling activation or modification of characteristics of the various electronic devices.

It is important to note that patterns movements are not always consistent. Accordingly, the system needs to be flexible enough to handle minor deviations. The reference data arrays obtained during a learning state during an automated control state, are adapted for evaluations of partial sequences by the system to utilize local alignments as between tracked sensory data when establishing a level of similarly in respect of a reference data array. Assessing partial sequences and local alignments aids in establishing similarity (e.g., degrees of similarity) for conducting match inquiries (e.g., 1:n) matching with reference data arrays even if the sensors were only able to observe partial data. A technical trade-off between flexibility and accuracy can be established.

To aid in reducing computational complexity and an overall usage of computational resources, further embodiments are described using compressed data arrays, which is useful where the system has limited computational resources (e.g., due to power supply constraints, memory constraints, processor constraints), or limited network resources (e.g., maximum bandwidth/throughput, potential signal collisions, spectral characteristics/noise characteristics). These variant embodiments are particularly useful where the number of sensors and/or the number of electronic devices is large and/or of an indeterminate number (e.g., a system that is adapted for scalability). Accordingly, the use of compressed data arrays allows for increased flexibility, potentially faster search times, and smaller memory requirements, relative to approaches without the use of compression.

Scalability is an important consideration as it aids in future-proofing a particular computational solution once it has been established—a home automation system may continue to grow as new electronic devices and new sensors are added to the implementation, and it is commercially valuable to have a system that is able to adjust accordingly despite limitations in computational and/or network capacity. In further variant embodiments, the system is adapted to track a plurality of individuals as they move through in accordance with a plurality of sensor devices.

In this variation, the tracked sensor data arrays can be configured to track relatively stronger or weaker activations through, for example, the number of individuals that are within proximity of the sensing, or for example, an average speed, an average distance (e.g., based on radial distance), an angle of activation (e.g., based on polar angles) or an average level of activation.

In another variant embodiment, aspects are directed to a portable remote sensor device, which, for example, can be a handheld or other type of device that houses sensors and/or electronic devices. The portable remote sensor described herein includes a central controller circuit that is adapted to operate in concert with the sensor and transmits signals to cause various electronic devices (e.g., lighting devices) to activate in a sequence. The sensor of the remote portable sensor device tracks which activations have been detected, which can then be used for automatic configuration of control logic through the generation and/or maintenance of associations thereof between the portable remote sensor and the corresponding electronic devices. This approach is useful in automatically generating associations without cumbersome manual entry by an individual, such as a user.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 5(a)-(d) are representations of a number of example data arrays comprised of a sequence of characters that corresponds to sensor signals ordered by time.

FIG. 7(a)-(c) are illustrations of FIG. 7(a) a room in which an innovative system of some embodiments is installed and a person is moving from one corner to the other following a path, FIG. 7(b) a composite data array from the sensed, which FIG. 7(c) is used to establish an inference represented in an updated data structure about the path of the person and its future according to a second method.

FIG. 10(b) is an illustration of a situation where a user walks through a premises and triggers the motion sensor in a weak manner in light 1 and in a strong manner in light 2. This information is communicated, and as a result, the controller determines that light 3 should adjust its desired light level to a higher value. The adjustment is made in advance of the user arriving into the space illuminated by light 3.

FIG. 12(b) shows a situation where light 3 learns that weak motion in light 1 may be followed by local strong motion. Hence, in the future, light 3 should start to turn on as soon as weak motion in light 1 is observed and communicated. Furthermore, light 3 learns that weak motion in its own sensor may be followed by local strong motion. Hence, in the future, light 3 should start to turn on as soon as local weak motion is observed. FIG. 12(c) shows a situation where light 3 learns that strong motion in light 2 may not be followed by local strong motion. Hence, in the future, light 3 should be less likely to turn on when strong motion in light 2 is observed and communicated. Furthermore, light 3 learns that weak motion in its own sensor may not be followed by local strong motion. Hence, in the future, light 3 may be less likely to turn on when local weak motion is observed.

DETAILED DESCRIPTION

Figure 1:
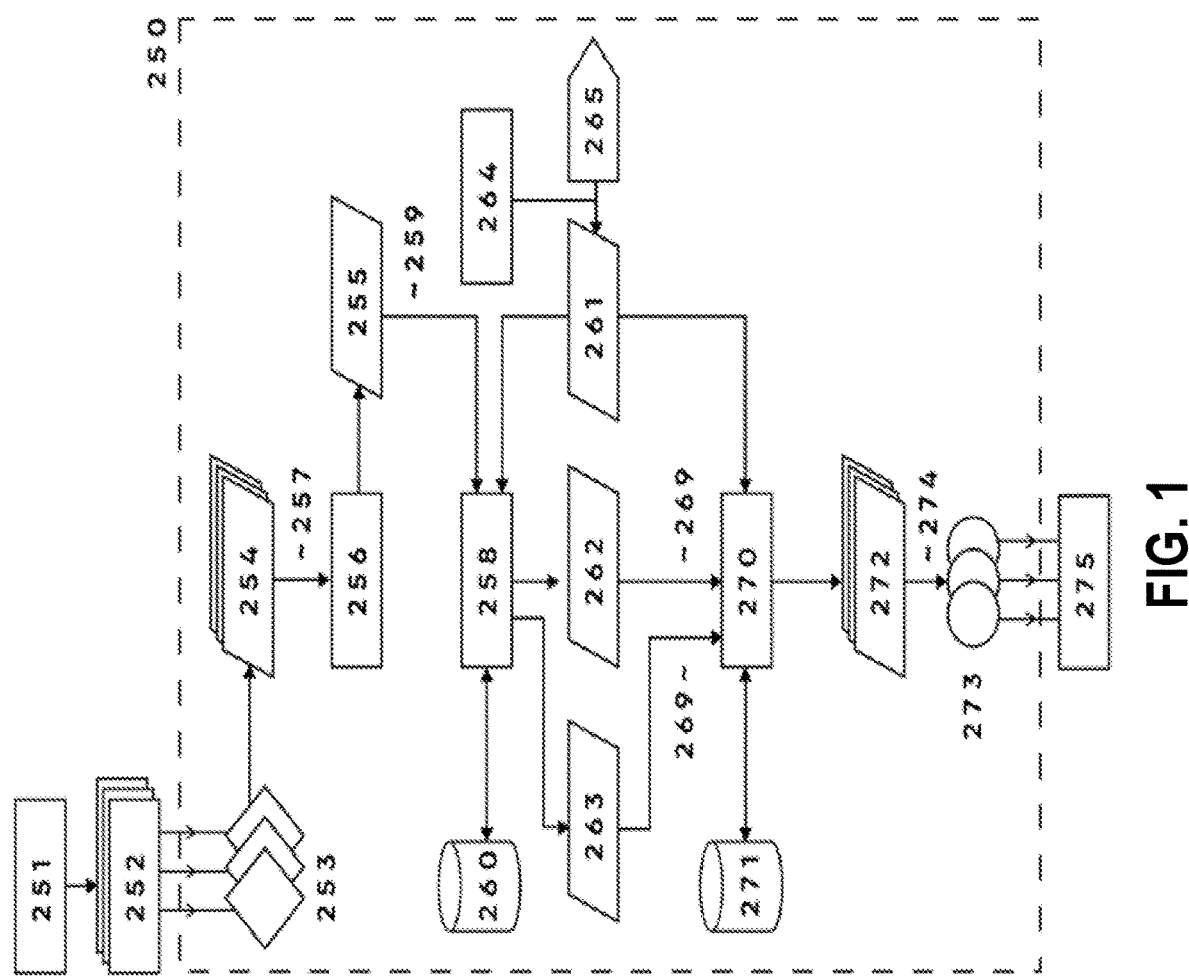
FIG. 1 is a flow chart illustrating actions taken by a system adapted for automated control of electronic devices comprising a plurality of components, data arrays and logical commands, adapted to perform the transformation of sensory data arrays representing behavior into a change of operational characteristics of the electronic devices within an environment. The system can be a sensor-actuator system.

As described in embodiments herein, improved lighting systems, control methods/processes, and non-transitory computer readable media (storing machine interpretable instruction sets for execution on one or more processors) are provided. In particular, these improved systems are directed to electronic devices (e.g., lighting devices and/or consumer electronic devices, such as locks, climate controllers) that operate in conjunction with a control mechanism (such as a controller hub, a control circuit) and various sensors (such as, but not limited to, motion sensors). In some embodiments, a learning protocol is established to provide a technical solution whereby sensor signals from the various sensors is utilized to implement an incremental approach to using sensed information from various sensors (in some embodiments, at least one remote sensing device and at least one local sensing device) to control changes in characteristics (e.g., lighting output) of one or more connected electronic devices (e.g., lighting devices).

The controller can be separate from the electronic devices and the sensors in some embodiments, for example, as a connectable device which can be coupled to the electronic devices and/or the sensors through one or more network connections. In another embodiment, the controller resides within or is directly coupled to one of the electronic devices and/or sensors, and that device or sensor acts as a master controller to the other electronic devices and/or sensors. The controller can be a physical control circuit, such as a controller computer having one or more coupled processors, memory, and data storage, in various embodiments. The controller may operate through execution of one or more machine interpretable instructions stored on non-transitory computer readable media by the one or more processors.

A system comprised of devices that can take action following commands issued by an automatic controller provides benefits to the user of the space in which the system is deployed. Examples of such systems in residential and commercial spaces include: A light-bulb at an entrance, which illuminates when a human approaches said entrance; a coffee-maker that is connected to the electrical grid via a timer, which switches on the coffee-maker at a time of the day shortly before the human occupants wake up with a desire to imbibe freshly brewed coffee; a thermostat, which receives a command to adjust the indoor temperature via the internet router, which in turn receives the command from a remote internet-connected smartphone device. Other devices can include locks (e.g., smart locks), vacuum cleaners, water heaters (for taking showers), among others.

These systems can include one or a plurality of sensors, one or a plurality of electronic devices, a communication network comprised of a plurality of connections or couplings capable of transmitting data arrays, and one or a plurality of logical commands and numerical evaluations that upon execution on one or a plurality of processing units associates data arrays from the sensors to actuations of the electronic devices.

In systems wherein the plurality of sensors and electronic devices is great in number, and the plurality of types of sensors and electronic devices is great in number, the range of possible associations between the logical commands is great as well. Consequently, the possible utility of the system increases as a wider range of properties of the indoor space can be measured or inferred, and additional capabilities of the indoor space can be acted upon to meet the needs of the persons in the space, while also optimizing operating costs and resource use. This is particularly salient for resources that can be consumed in excess due to forgetfulness, like electrical power to lighting or indoor temperature control. This is particular salient to persons who are disabled or otherwise less able in a particular moment to use the common manual control systems of typical indoor spaces. As noted herein, additional variants are described that aid in scalability where the number of sensors and/or electronic devices is significant enough such that constraints on processing power or network capabilities cause technical limitations.

A sizeable plurality of sensors and electronic devices increases the complexity of possible associations as well. In other words, the useful associations between sensors and electronic devices can increase in number, but so too, and to a greater extent, can the useless and possibly harmful associations. The useful operation of the system can therefore require innovation with respect to how the logical commands are constructed. This can include additional logical commands and numerical evaluations that upon execution generates the logical commands that are the most relevant to the particular installed system. This can include the automated training of the particular installed system, such that it performs a useful function while negating or lessening the occurrence of useless function.

An additional challenge of control systems is that the presence of certain sensors can make persons perceive the space as intrusive or uncomfortable. The worry that a malicious actor gains access to the sensor data can in the mind of the person outweigh the utility of a more refined automatically controlled space. The worry can include that private information and events become known, which the person only wishes to disclose through a deliberate act, if at all. It has been noted that "unease over data privacy will retard consumer acceptance of IoT deployments." (*Privacy Mediators: Helping IoT Cross the Chasm*, by Davies, Taft, Satyanarayanan, Clinch, Amos, 2016).

These worries imply that a system that is technically constrained with respect to particular data of the space or location, yet still capable of executing logical commands that lead to useful operation, can be of superior utility to a system that employs higher resolution sensors for more precise or wider range measurements. In other words, the system requirement to predominately execute useful logical associations, rather than useless of harmless ones, can be at variance with the system requirement to overcome consumer unease with respect to their privacy.

The deliberate technical constraint of making the system unable to sense, detect, or infer certain features of the space, premises, location, or room, as well as the persons in said space, premises, location or room, means innovative technical solutions have to be created in order for the system to still be able to operate at adequate accuracy despite said constraints.

One of the three privacy engineering principles formulated by the National Institute of Standards and Technology (NIST) of the United States Department of Commerce, is predictability. A system in accordance with said principle enables "reliable assumptions by individuals, owners and operators about Personally Identifiable Information and its processing by an information system" (see NISTIR 8062). A system with sensors that are fundamentally unable to measure the properties of concern is highly predicable in this regard, and thus preferred.

The innovative control system and innovative method for control system operation that is described in various embodiments further below, address the challenges outlined above. The systems and methods can build on (1) a plurality of individually lower-resolution sensors, neither of which can reveal certain sensitive private information either by proper or improper use, (2) wherein the plurality of sensors is installed in a spatially distributed manner throughout the room, office, or space in general, (3) and wherein the spatially distributed sensor data enables the prediction of a partial behavior or prediction of a future partial behavior of the person or persons in the space. Specific technical problems relating to the use of lower-resolution sensors as well as obtaining spatial relationships and patterns are addressed in various embodiments where the system is configured to incrementally learn patterns, which are then used to control characteristics of the electronic devices (e.g., lights and motion sensors operating in conjunction to maintain various data structures on a backend that, as trained from patterns extracted from an individual's actuations, begin to recognize/identify the routines and automatically actuate/de-actuate lights as the individual undergoes the routines without further manual activation).

It is the relatively high number of relatively simple sensors that enables the type of inference that precludes unwanted breach of privacy, while preserving the ability to infer relevant behavioral patterns for useful control of the electronic devices. A single low-resolution sensor, like a motion sensor, is inadequate to attain the desired accuracy. A single high-resolution sensor, like a camera, raises privacy concerns, in addition to demanding a great deal of bandwidth to transfer the data. A plurality of low-resolution sensors (e.g., motion sensors) operated in concert can provide adequate accuracy while preserving private information.

Specific approaches as described herein can overcome some of the limitations that previous simple motion-sensor based electronic devices encountered (e.g., simple lights that simply turn on when motion is detected that are unable to learn when they not turn or learn from sensed movements from other motion sensors). Hence the innovative system and innovative method for system operation can facilitate consumer adoption of useful internet of things (IoT) deployments, which other systems on the market have failed to do.

Furthermore, the innovative control system and innovative method for control system operation that is described below, include adaptation and learning of associations between sensor signals, inferred partial behaviors, and the actuation of electronic devices. Rather than relying on taxing explicit configuration of devices in the system by the person installing the system, the system can be passively configured (e.g., automatically) over time as the space in which the system is installed is used. That means the operation of the system can change over time to reflect new behavioral patterns or alteration to the system after its initial installation.

The system is more flexible and does not need specific programming skill or time invested into manually entering rigidly defined patterns or routines. Furthermore, as noted herein, the system can be adaptable through partial matching and array prediction (e.g., based on local alignments) such that a minor variation or deviation from a particular routine can still be captured. For example, an individual may not always walk through the exact same path to get dressed in the morning, but there can be a subset of representative elements that are almost always present. The system automatically adjusts for a level of flexibility, which is an improved technical feature that is useful, overcoming the deficiencies of rigidly defined naïve "if-this-then-do-that" type manual entries, which require rigid adherence to the conditions stored thereon.

The innovative control system can furthermore operate without the spatial relations between sensors and electronic devices explicitly known. Accordingly, a more flexible variety of potential implementations are possible (e.g., as opposed to expensive systems specifically designed for a specific space, such as a concert hall). However, some control applications of the system can be enabled, or become more accurate, in case these relations of the system are known. Therefore, in some embodiments of the innovative system, the relative spatial relations between sensors are automatically derived with an innovative method executed for a particular installation of the control system. This includes the operation of the system with a portable remote sensor device.

For these reasons, the innovative control system accomplishes to overcome two of the main hurdles to Internet of Things (IoT) and Artificial Intelligence (AI) operation of a residential or commercial space by both handling complexity through an adaptive method, and keeping private information hidden from the system in a predicable manner. A great deal of useful applications are thus enabled, as further illustrated in various embodiment described below.

System for Automatic Operation

The operation of the control system is described in this section and the manner it functions in conjunction with persons and devices in the indoor space. The indoor space, or space, or location, can refer to one or a plurality of rooms in a house or an apartment, to a location bounded by walls, ceiling and floor, to office spaces in a workplace, to spaces for commercial and hospitality services, such as restaurants and hotels, or care facilities and hospitals. Other types of spaces or locations can be contemplated, as long as they are spatially confined and that electronics devices can be operated within them.

Referring to FIG. 1, the operation of the control system 250 is preceded by behavior within the space the system is installed and operated. Behavior can be a description of what is happening in the space. Behavior in turn creates a plurality of percepts 252, which are physical manifestations of the behavior. Percepts are the basic datum that is perceived, and is a consequence of the behavior, but not necessarily such that only one behavior imply one percept.

In order to exemplify what behavior and percepts can be, consider an illustrative scenario wherein a blue-eyed man is walking from the entrance of a room to a desk in the corner of the room, while he is talking to this mother on his mobile phone, while also perspiring from his commute to the room. This is a description of a behavior of a particular identifiable person. The percepts in this case can be: light waves reflecting off the person's body, which have the potential to reveal his blue eye color; mechanical air waves that carry the sound of his conversation, which have the potential to reveal what the man is saying to his mother; trace amounts of volatile molecules, which have the potential to reveal that the person is perspiring; Doppler shifted reflected waves of electromagnetic radiation emitted from a plurality of motion sensors, which have the potential to reveal that the person is moving from the entrance towards the corner desk. Additional percepts can be contemplated for the illustrative behavior.

Percepts can interact with one or a plurality of sensors 253. Sensors are devices comprised of components that enable the interaction with the relevant percept, and components that translate said interaction into an electrical signal, and components that support and power the other components.

In some embodiments the plurality of sensors can include motion sensors. A motion sensor in the plurality of sensors can detect and characterize local motion. That means motion that is beyond a sensor distance threshold from the location of the motion sensor is not detected and characterized by the motion sensor. The sensor distance threshold can be a radius of 2 meters, a radius of 5 meters, a radius of 20 meters. The sensor distance threshold can be further limited by objects near the sensor, such as walls, furniture, and doors.

A motion sensor can employ motion sensor technology such as Passive Infrared (PIR) technology, Doppler radar microwave, Doppler radar ultrasonic wave, Tomographic motion detection. Other motion sensor technology can be contemplated.

The characterization of the local motion, as ascertained by a motion sensor and embodied in the electrical signals internal to the sensor, can be further embodied as a sensor data array 254. A motion sensor is however unable to interact with the percept that has the potential to reveal the content of the conversation in the illustrative embodiment. The sensor data array is therefore void of that information. A plurality of local motion characteristics is a motion pattern. A motion pattern can be detected and characterized by one or a plurality of motion sensors.

In other embodiments the plurality of sensors can include a low-resolution microphone. The microphone can interact with mechanical air waves, which can be percepts to spoken words, music, or colliding objects. Waves within a range of frequencies and amplitudes induce vibrations of a membrane, a motion that in turn generates an electrical signal internal to the sensor. This electrical signal can be further embodied as a sensor data array 254. The sensor data array can be comprised of data values that quantify the amplitude of the mechanical wave within a frequency range, such as 10 Hertz, 20 Hertz, 1000 Hertz, 20 kilohertz.

In other embodiments the plurality of sensors can include ambient light sensors. The light waves in the room that reaches a detector surface of the sensor interact with a solid-state material with the property that charge is conducted only if light within a range of frequencies lands on said material. The conducted charge leads to an electrical current or an electrical voltage internal to the sensor. This electrical current or electrical voltage can be further embodied as a sensor data array 254. The sensor data array can be comprised of data values that quantify the flux of incident light within a frequency range, such as 300 terahertz, 400 terahertz, 700 terahertz, 1000 terahertz.

In other embodiments the plurality of sensors can include switches. The switch can interact with forces exerted by the person, either through gravitational pull towards a supporting surface like floor or seat, or by touching, pressing or twisting a component of a sensor. The switch can be a press button switch, rotary switch, slide switch, toggle switch, rocker switch, key lock switch, a combination of switches. Other switch technology can be contemplated. The switch signal can be embodied as a sensor data array 254. The switch data array can be comprised of data values that quantify in what configuration the moveable parts of the switch are set, such as "toggle in off-state", "toggle in on-state", "slider at 25%", "slider at 75%", or if the moveable part is uniquely defined in operations, the data values can be 1, 0, 25%, 75%.

In other embodiments the plurality of sensors includes a camera. The highly resolved variable light captured by the lens of the camera can be embodied as a sensor data array 254. With a first computer vision method, the data array can be interpreted as behavior of persons in the space, such as motion.

However, the high-resolution data can with a second computer vision method reveal the person's outward appearance, and through lip reading, the content of the conversation. Methods to use a machine to predict content of a conversation from a video stream of a person's moving mouth have been disclosed, such as Deep Audio-visual Speech Recognition from December 2018 in IEEE Transactions on Pattern Analysis and Machine Intelligence. Malicious access to this type of sensor data array can therefore threaten the person's privacy. The worry what such malicious access could reveal, can itself deter the person from installing the camera sensor.

A sensor that generate identical, or nearly identical, sensor data arrays regardless of how the lips are moving of a person in the room, is therefore fundamentally incapable of revealing content of speech. Consider a first variation of the illustrative scenario of the man speaking over phone with his mother, and in this first variation he is speaking a numerical password to a bank account to his mother. The plurality of low-resolution motion sensors can be "10.0, 0.0, 0.0, 1.0", which quantify his motion pattern as ascertained by the sensors in operation.

Consider a second variation of the illustrative scenario of the man speaking over phone with his mother, and in this second variation he is saying "Jabberwocky" to his mother. The plurality of low-resolution motion sensors can be "10.0, 0.0, 0.0, 1.0", which quantify the motion pattern as ascertained by the sensors in operation.

In the first and second variations of the illustrative scenario the plurality of low-resolution motion sensors are creating identical sensor data arrays despite different behaviors by the man in the location. The private and sensitive message of a password can in other words not be distinguished from the utterance of gibberish. Even if the sensor data array is accessed by a malicious actor, the private information cannot be retrieved from it with any method.

Other types of sensors can be contemplated, which either interact with different percepts, or which by different physical means generate the signal embodied as a sensor data array. Other sensors can include sensors that provide additional elements of information, such as time, humidity, outside temperature, outside ambient light, expected outside ambient light for a given geospatial position (e.g., is the sun up or sun down), moon phases/tidal phases, among others. Sensors can be homogeneous in some embodiments, or heterogeneous in other embodiments.

The types of sensors that are used in a control system, and the percepts they interact with, are material to the operation of system. That includes considerations of what can be sensed as well as what cannot be sensed. In some applications, simpler or lower-resolution sensors can be preferred, such as motion sensors.

In the non-limiting illustrative embodiments described below, the plurality of sensors are comprised of motion sensors, but not all embodiments are limited so.

The plurality of data arrays 254 are compiled into a composite sensor data array 255 by a joiner device 256. The joiner device is coupled 257 to the plurality of sensors, such that it can receive the plurality of sensor data arrays 254. The coupling 257 can be comprised of an antenna transmitting and receiving a wave of electromagnetic radiation at 2.4 Gigahertz, which through modulation can encode the plurality of data arrays. The coupling and plurality of data arrays can be configured such that the Wi-Fi protocol is used for transmission. Other protocols can be used, such as but not limited to Bluetooth™, Thread™, Zigbee™, Z-Wave™, LTE, 4G, 5G. Other proprietary protocols can be contemplated for wireless data transfer.

The coupling 257 can be wired, wherein an electrical signal is transmitted via a conductive medium, such as copper wire or a copper trace in a printed circuit board (PCB) or fibre optics. Through modulation, such as but not limited to pulse-width modulation (PWM), the plurality of data arrays 254 are communicated between the sensors and the joiner device 256. Protocols for wired data transfer, such as but not limited to Ethernet and Universal Serial Bus (USB) can be contemplated.

The coupling 257 can be mediated by secondary devices, such as an Internet router. The joiner device 256 can in these embodiments be physically located far away from the sensors, for example on a server in the cloud. In these embodiments the sensors transmit the plurality of data arrays over connections of the Internet. In comparison to the wireless and wired coupling methods illustrated above, transmission of data arrays over the Internet adds overhead to the transmission and additional communication latency can be a consequence. An advantage of a remote joiner device 256 in the cloud is that the same computational resources and logical commands and numerical evaluations can be used to process the plurality of sensor data arrays 254 from a plurality of distinct installations of the system.

Other means of coupling that enable transmission of data arrays can be contemplating, including audio waves or light waves.

In other illustrative embodiments, a combination of methods of coupling sensors to the joiner device can be used. The control system can be comprised of a plurality of motion sensors installed in a space between one and fifty meters from the joiner device, and the corresponding coupling method is wireless Bluetooth communication. The control system can be further comprised of an ambient light sensor integrated with the electronics hardware of the joiner device, and the corresponding coupling method uses a conductive metal trace within the electronics hardware. The control system can be further comprised of press buttons and slide switches installed on walls of the space, and the corresponding coupling method uses electrical wire for some of the switches, and wireless Bluetooth communication for other switches.

In some embodiments, each data array in the plurality of data arrays 254 contains a unique identifier (e.g., absolute unique or relative unique), which denotes the sensor that generated the particular data array. In some embodiments, the controller assigns relatively unique identifiers if none already exist (e.g., where the controller is being retrofit to a system that has no identifiers).

In other embodiments, the unique identifier that associates a data array to a particular sensor can be inferred from other properties of the plurality of data arrays 254, such as the ordering of the plurality, or from which coupling 257 the data array was received over. One method to infer the unique identifier that associates a data array to a sensor, but without the sensor appending this data explicitly to its created data array is disclosed in Data Transport Method in Hierarchical Data Networks (WO 2019/134046).

In some embodiments, the composite data array 255 that the master device creates can be created through the concatenation of all data arrays in the plurality of sensor data arrays 254. The composite data array can be understood as a dictionary, keyed on the unique sensor identifier, with the corresponding data array as the associated value.

In other embodiments, the composite data array 255 is created by appending the most recently received data arrays to the plurality of previously received data arrays. This data array operation can therefore generate a composite data array 255, which embodies a time-series of sensor signals. The composite data array can be understood as a dictionary, keyed on the unique sensor identifier and a unique time identifier, with the corresponding data array as the associated value.

In other embodiments, the composite data array 255 is created by appending the most recently received data arrays to the plurality of previously received data arrays, and deleting the plurality of data arrays received at a time removed from the present time by more than a first threshold. This data array operation therefore generates a composite data array 255, which embodies a time-series of sensor signals, though limited to time instances no further into the past from the present than the first threshold. The composite data array 255 can be understood as a dictionary, keyed on the unique sensor identifier and a unique time identifier, with the corresponding data array as the associated value. The composite data array 255 is not necessarily a continuous appending of the most recently received data arrays, but rather, in some embodiments, the composite data array 255 is a composite snapshot at different discrete points in time.

The composite sensor data array 255 is transmitted to an inference engine 258, which can be implemented as a hardware processing circuit, or as a software processing module, or a combination of both. The inference engine 258 is coupled to the joiner device, such that it can receive the composite sensor data array 255. The coupling 259 can be comprised of an antenna transmitting and receiving a wave of electromagnetic radiation at 2.4 gigahertz, which through modulation can encode the data array. The coupling and plurality of data arrays can be configured such that the Wi-Fi protocol is used for transmission. Other protocols can be used, such as but not limited to Bluetooth™, Thread™, Zigbee™, Z-Wave™, LTE, 4G, 5G. Other proprietary protocols can be contemplated for wireless data transfer.

The coupling 259 can be wired, wherein an electrical signal is transmitted via a conductive medium, such as copper wire or a copper trace in a printed circuit board (PCB) or fibre optics. Through a modulation method, such as but not limited to pulse-width modulation (PWM), the data array 255 is communicated between the master device and the inference engine. Protocols for wired data transfer, such as but not limited to Ethernet and Universal Serial Bus (USB) can be contemplated.

The coupling 259 can be mediated by secondary devices, such as an Internet router. The inference engine 258 can in these embodiments be physically located far away from the joiner device 256, for example on a server in the cloud. In these embodiments the master device sends the composite data array over connections of the Internet with typical protocols and addresses. In comparison to the wireless and wired coupling methods illustrated above, transmission of data arrays over the Internet adds overhead to the transmission and additional communication latency can be a consequence. An advantage of placing the inference engine 258 in the cloud is that the same computational resources and logical commands and numerical evaluations can be used to process the composite sensor data array 255 from a plurality of distinct installations of the system.

In some embodiments, the inference engine 258 is situated within the same electronic device as the joiner device 256. In these embodiments the inference engine 258 and the master device can share one or a plurality of electronics components, such as digital memory and processing unit. In these embodiments, the preferred communication medium 259 is wired communication since that reduces latency of the transfer the composite data array 255 to a minimum.

The inference engine 258 is comprised of a plurality of logical commands and numerical evaluations that upon execution transforms the data in the composite data array. The execution of said logical commands and numerical evaluations can furthermore use input data arrays retrieved from a reference library 260 as well as one or a plurality of global state data arrays 261. At the conclusion of the execution, the inference engine 258 outputs either one or both of a partial behavior prediction and a partial future behavior prediction 263.

The global state data array or the plurality of global state data arrays 261, is a data representation of properties the system has access to, but which are not obtained from the plurality of sensors 253. The global state data array can in part of in full be compiled of data retrieved from internal components 264 to the system. The global state data array can in part of in full be compiled of data retrieved from external devices via a communication port or antenna 265.

In some embodiments the global state data array can be comprised of a time of day data array represented as an hour of the day, minute of the hour, second of the minute. The time of day can in some embodiments be retrieved from an internal clock generator, such as but not limited to a quartz piezo-electric oscillator. In other embodiments the time of day is retrieved through a communication port or antenna coupled to an external device that can be queried for the time of day, such as but not limited to a Bluetooth antenna coupled to a nearby smartphone.

In other embodiments the global state data array can be comprised of an ambient brightness data array represented as one or a plurality of luminance numbers in units of candela per square meter, candela per square foot, nit, or other units. The ambient brightness data can be measured with ambient light sensors distributed in the space and able to communicate their data arrays via a communication port or antenna of the system.

In other embodiments the global state data array can be comprised of a counter of the number of human individuals in the space. The value of the counter can be determined through interaction with a secondary device, such as but not limited to an entry card reader or the number of mobile phone devices connected to the home Wi-Fi network.

In other embodiments the global state data array can be comprised of a bedtime index. The user of the space can set the bedtime index through a secondary device, such as a smartphone or button. In illustrative embodiments the bedtime index is set to one in order to indicate the intention of the persons in the space that they will sleep, and set to zero to indicate the absence of said intention. Other types of global state data arrays can be contemplated.

The reference library 260 is comprised of a plurality of data arrays against which logical and numerical comparisons can made. The plurality of data arrays stored in the reference library represent information about a range of sensor data, which typical or specific behaviors in the space give rise to.

Figure 2:
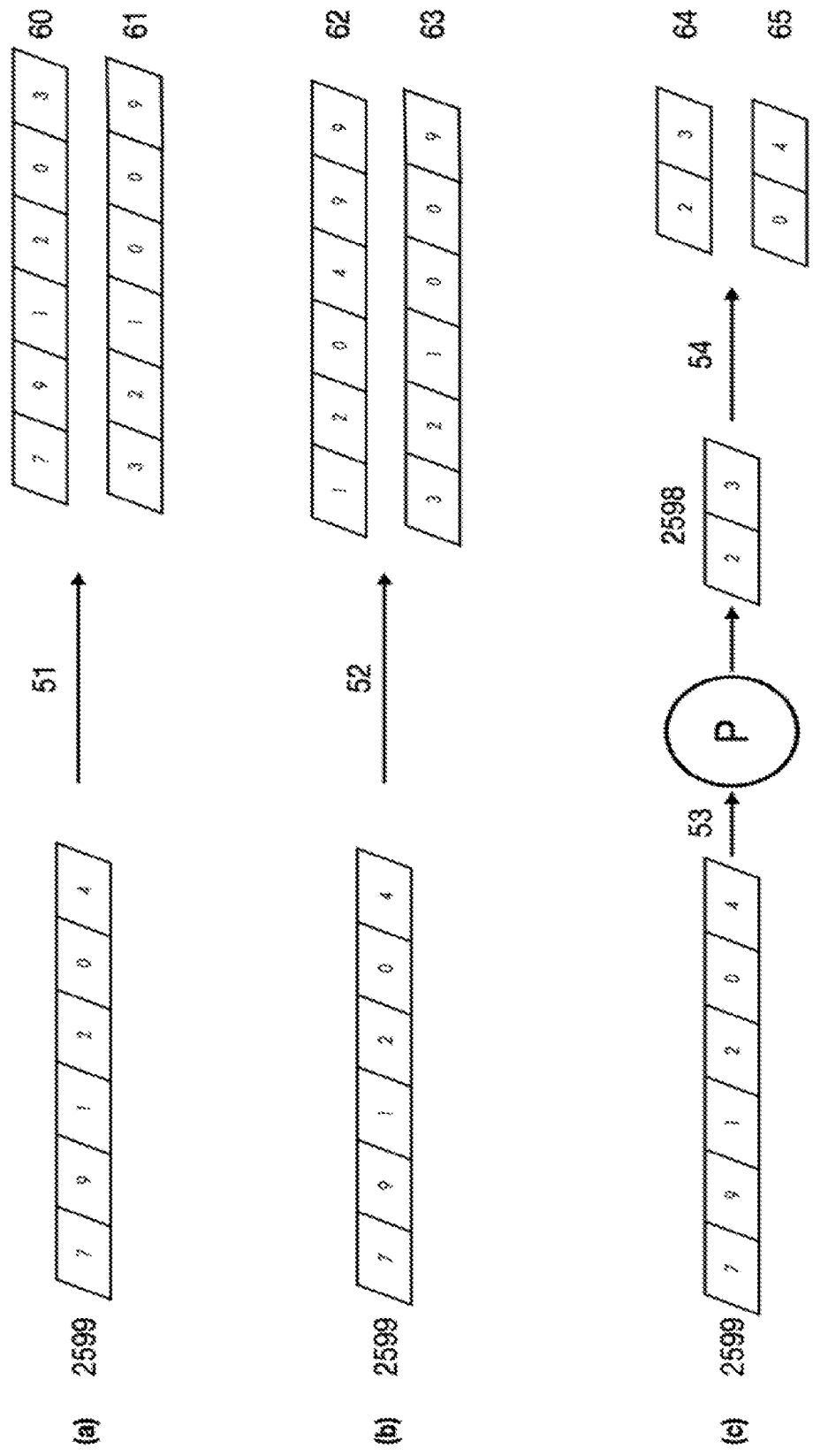
FIG. 2(a)-2(c) shows illustrative embodiments of the comparison of a composite data array from a sensor signal, to two reference data arrays, where in FIG. 2(a) the degree of similarity is with respect to the entire composite data array and the entire reference data arrays, where in FIG. 2(b) the degree of similarity is with respect to locally aligned parts of the composite data array and the reference data arrays, where in FIG. 2(c) the degree of similarity is with respect to a compressed version of the composite data array the reference data arrays.

Three illustrative embodiments of logical and numerical comparisons that can be made are shown in FIGS. 2(a), 2(b), and 2(c), and described further below. The particular composite data array 2599 of the illustrative embodiments is comprised of a sequence of six integers.

The data arrays in the reference library can in some embodiments be of an identical shape and meaning as the composite data arrays, see FIG. 2(a). In these embodiments the logical and numerical comparisons 51 that are made between the composite data array 2599 and the reference data arrays 60, 61, can be tests of equality. In these embodiments the logical and numerical comparisons that are made can be tests of approximate equality, or a degree of similarity, between a given composite data array 2599 and the reference library data arrays 60, 61. In the illustrative embodiment, the composite data array is approximately equal to reference library data array 60.

Methods of evaluating approximate equality or degree of similarity can be Euclidean distance, Manhattan distance, Minkowski distance, Hamming distance, Cosine similarity, Levenshtein distance, Damerau-Levenshtein distance, Jaro distance, Longest common subsequence distance, Bray-Curtis distance, Canberra distance, Chebyshev distance, Mahalanobis distance. Other methods can be contemplated, which quantifies a similarity between at least two data arrays as a single value.

In other embodiments the logical and numerical comparisons that are made relate to approximate equality, or a degree of similarity, of partial sequences of the composite data array and the data arrays in the reference library, see FIG. 2(b). In these embodiments the logical and numerical comparisons 52 that are made between the composite data array 2599 and the reference data arrays 62, 63, can be tests of approximate equality, or a degree of similarity, between a partial but contiguous section of the composite data array and a partial but contiguous section of a data array in the reference library. The comparison can be comprised of a local alignment of one section of the composite data array to another section of a data array in the reference library. In the illustrative embodiment, the composite data array 2599 has greater similarity to data array 62 than to data array 63 on account of the four contiguous values that can be locally aligned.

Methods of local alignment can be, but is not limited to, the Smith-Waterman algorithm, dynamic programming, and the k-tuple word method. Methods of local alignment can require a method to evaluate degree of similarity between sections of data arrays. The same methods as for the illustrative embodiment of FIG. 2(a) can be used. Other methods of local alignment and degree of similarity can be contemplated.

In other embodiments the data arrays in the reference library represent relevant information in a different form than the composite data array. The different forms can be compressed forms of a plurality of data arrays, as obtained by a clustering method or a projection method that reduces the dimension of the data arrays in the reference library, see FIG. 2(c). In these embodiments the logical and numerical comparisons that are made between the composite data array 2599 and the reference data arrays 64, 65, can be preceded by a transformation of the composite data array to its compressed form 2598 and then compared 54 against the data arrays of the reference library. The compression can lead to losses of information in the composite data array, however, if losses are small, the advantages of smaller sizes of the data arrays can make this a preferred method.

Methods of clustering or projection can be, but is not limited to, Principal Component Analysis (PCA), kernel PCA, generalized discriminant analysis, Sammon mapping, k-means clustering, affinity propagation, agglomerative clustering, t-distributed stochastic neighbor embedding. Other methods of clustering or projection can be contemplated.

An illustrative embodiment for which compression provides reduced size of the data arrays at a negligible loss of information is a room in which four motion sensors are installed, however, the first and second sensors are very close to each other, and the third and fourth sensors are very close to each other. The composite sensor data array is comprised of four data values. However, the first and second data values are always nearly identical due to their spatial proximity, and the third and fourth data values are always nearly identical due to their spatial proximity. A compressed form of the composite data array is comprised only of the first and third data values.

In case the first and second sensors are installed farther apart than in the illustrative embodiment above, the information contained in the first and second data values is increasingly non-redundant or uncorrelated. Therefore, compression is either not possible, or only with a greater loss of information about motion patterns in the room. Through a grid search of the compression parameters defined by the compression method an appropriate compression can be attained, which reduces the size of the data arrays, with an acceptable loss of information as far as the system operation is concerned.

Other methods of logical and numerical comparisons can be contemplated. The relevant property is that their evaluation quantifies similarity between at least two data arrays, such that a given composite data array derived from sensor data arrays can be ascertained as more or less like a reference data array.

The reference library 260 can further be comprised of a volatile computer memory, or non-volatile computer memory, such as but not limited to a dynamic random-access memory, a static random-access memory, a flash memory, a floating gate device, a nitride read only memory. The plurality of data arrays in the reference library can be updated during the course of system operation as the inference engine is executed.

The partial behavior prediction 262 is comprised of a data array that represents an inferred or predicted feature of the behavior 251. The prediction does not encompass all features of the behavior, it is hence only partial. The partial future behavior prediction 263 is comprised of a data array that represents an inferred or predicted future behavior that will within some duration of time follow the present behavior 251. The prediction does not encompass all features of the behavior, it is hence only partial.

The system operation steps and components described so far comprises the sensing and interpretation capability of the control system. A subset of percepts are sensed, and the meaning of the sensor signals are interpreted, and the interpretation encoded as prediction. A prediction can be associated with a probability, which denotes the certainty by which the control system has made its interpretation.

Following the execution of the sensing and interpretation, the prediction can be evaluated against one or a plurality of objectives, and control actions can be constructed. The steps and components comprising the latter half of the control system are described in detail in later paragraphs.

In order to illustrate the outcome for the system in operation as shown in FIG. 1, as the components of the system work in concert, a room 300 and a person 333 is shown in FIG. 3(a). The person 333 has entered the room in the upper left corner. In the room a plurality of electronic devices are installed, 2731-2734 and 2735. The former electronic devices are LED light bulbs that can have variable brightness. The latter electronic device is a door lock that can be either open or close. Furthermore, in each LED lightbulb motion sensor components are installed.

In operation, the system follows these steps. Person 333 in FIG. 3(a) generates a percept, which the motion sensor in 2731 senses. An electrical signal is created through the sensing, which the sensor embodies as a sensor data array. None of the other sensors, 2732-2734, interact with a percept, therefore their sensor data arrays are empty or null.

A composite data array for FIG. 3(a) is created by concatenation of the four individual sensor data arrays. A comparison of the composite data array is made against a plurality of data arrays stored in a reference library. For the case in FIG. 3(a), no inference can be made of where person 333 will move next.

The absence of an inference is compared against a rules library, and only the LED lightbulb 2731 should be switched on to full brightness since it is only in its vicinity local motion has been detected. An operational data array is created. It is comprised of a brightness value, 100%. The operational data array can further be comprised of a network address that corresponds with lightbulb 2731.

The operational data array is transported over the network. Each electronic device connected to the network receive the operation data array. For electronic devices 2732-2735 the operational data array creates no change. For electronic device 2731, however, the operational data array is interpreted by the electronic components internal to 2731. The brightness value, 100%, is retrieved and the electrical current that is driving the light-emitting diodes is changed to the value that corresponds to 100%, such as 30 milliamps, 60 milliamps, 100 milliamps.

In the illustrative example, the person 333 moves from the upper left position in FIG. 3(a) to the lower left position in FIG. 3(b). The percept is interacting with the sensor in 2733, and weakly with the sensor in 2731. A composite data array is created for FIG. 3(b) by concatenation of the four individual sensor data arrays. A comparison is made against a plurality of data arrays stored in a reference library.

For the case in FIG. 3(b), an inference can be made of where person 333 will move next. The motion pattern embodied in the two composite data arrays, the one from FIG. 3(a) and the one from FIG. 3(b), is inferred to mean person 333 is moving away from the electronic device 2731, and towards electronic device 2734. It is noted that no local motion is detected near 2734 in FIG. 3(b).

This inference, along with the local motion adjacent to 2733, are compared against the rules in the rules library. Three operational data arrays are created as follows. A brightness value, 100%, is associated with a network address that corresponds with lightbulb 2733. A brightness reduction command "dim down fast", is associated with a network address that corresponds with lightbulb 2731. A brightness increase command "dim up fast", is associated with a network address that corresponds with lightbulb 2734.

The three operational data arrays are transported over the network. Each electronic device connected to the network receive the operation data arrays. For electronic devices 2732 and 2735 the operational data arrays create no change. For electronic device 2733, however, the first of the three operational data arrays is interpreted by the electronic components internal to 2733. The brightness value, 100%, is retrieved and the electrical current that is driving the light-emitting diodes is changed to the value that corresponds to 100%, such as 30 milliamps, 60 milliamps, 100 milliamps.

The second of the three operational data arrays is interpreted by the electronic components internal to 2731. The brightness reduction command "dim down fast", is retrieved and the electrical current that is driving the light-emitting diodes is gradually reduced until zero electrical current is driving the light-emitting diodes. The reduction is computed such that each second 10 milliamps less electrical current is driving the light-emitting diodes compared to the previous second. In other words, within 3 seconds to 10 seconds the LED lightbulb 2731 is gradually dimmed down to no light.

The third of the three operational data arrays is interpreted by the electronic components internal to 2734. The brightness increase command "dim up fast", is retrieved and the electrical current that is driving the light-emitting diodes is gradually increased from zero up to the current that corresponds to 100%, such as 30 milliamps, 60 milliamps, 100 milliamps. The increase is computed such that each second 10 milliamps more electrical current is driving the light-emitting diodes compared to the previous second, unless the 100% value has been reached.

Figure 3:
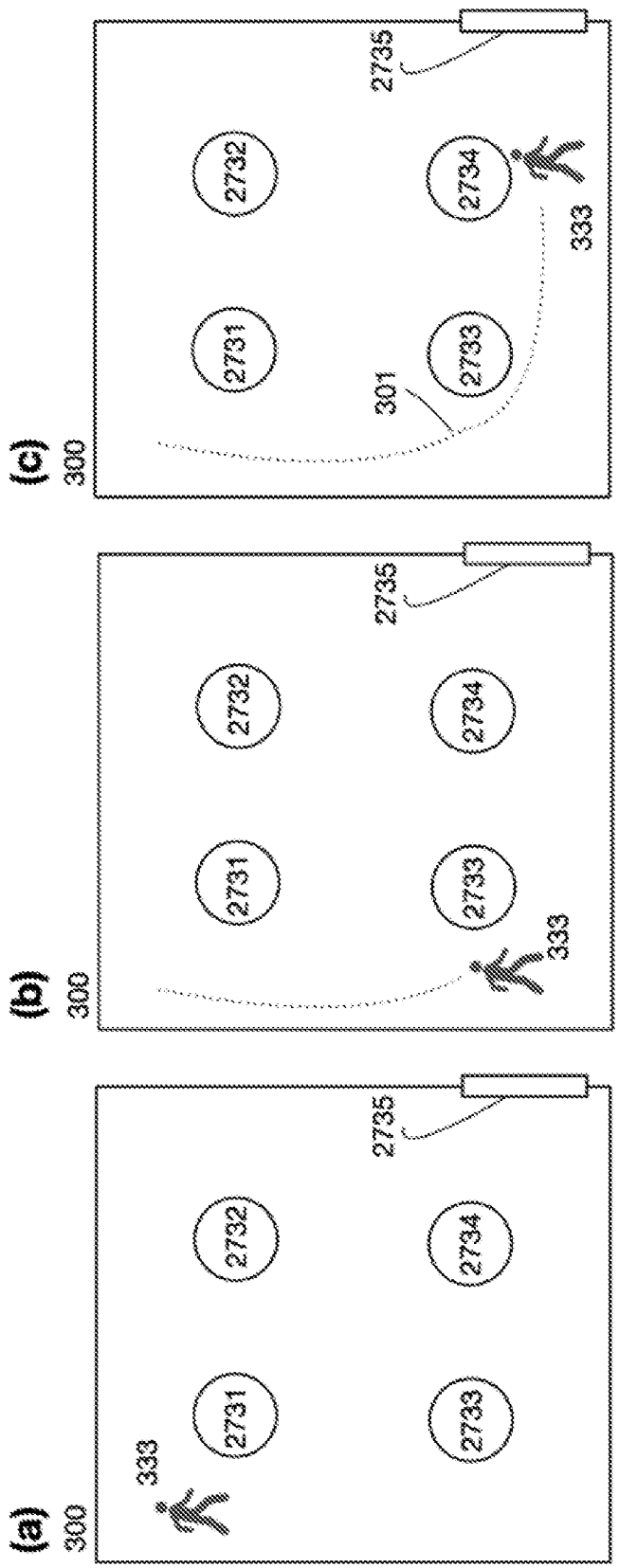
FIG. 3(a)-(c) are illustrations showing an illustrative embodiment of a person walking from FIG. 3(a) the upper left corner of a room, to FIG. 3(b) the lower left corner of the room, and onwards to FIG. 3(c) the lower right corner of the room, and along the path the lights and a locked door changing in anticipation of the walked path.

In the illustrative example, the person 333 moves from the lower left position in FIG. 3(*b*) to the lower right position in FIG. 3(*c*). The percept is interacting with the sensor in 2734. A composite data array is created for FIG. 3(*c*) by concatenation of the four individual sensor data arrays. A comparison is made against a plurality of data arrays stored in a reference library.

For the case in FIG. 3(*c*), an inference can be made of where person 333 will move next. The motion pattern embodied in the three composite data arrays, the one from FIG. 3(*a*) and the one from FIG. 3(*b*), and the one from FIG. 3(*c*) is inferred to mean person 333 is moving away from the electronic device 2733 and towards the electronic device 2735, the door.

This inference, along with the local motion adjacent to 2734, are compared against the rules in the rules library. Three operational data arrays are created as follows. A brightness value, 100%, is associated with a network address that corresponds with lightbulb 2734. A brightness reduction command "dim down fast", is associated with a network address that corresponds with lightbulb 2733. A lock command "unlock door" is associated with a network address that corresponds with door lock 2735.

The three operational data arrays are transported over the network. Each electronic device connected to the network receive the operation data arrays. For electronic devices 2731 and 2732 the operational data arrays create no change. For electronic device 2734, however, the first of the three operational data arrays is interpreted by the electronic components internal to 2734. The brightness value, 100%, is retrieved and the electrical current that is driving the light-emitting diodes is changed to the value that corresponds to 100%, such as 30 milliamps, 60 milliamps, 100 milliamps.

The second of the three operational data arrays is interpreted by the electronic components internal to 2733. The brightness reduction command "dim down fast", is retrieved and the electrical current that is driving the light-emitting diodes is gradually reduced until zero electrical current is driving the light-emitting diodes. The reduction is computed such that each second 10 milliamps less electrical current is driving the light-emitting diodes compared to the previous second. In other words, within 3 seconds to 10 seconds the LED lightbulb 2733 is gradually dimmed down to no light.

The third of the three operational data arrays is interpreted by the electronic components internal to 2735. The lock command "unlock door" is retrieved, and the electrical operation of the door lock is altered, such that the door can be opened by gently pushing or pulling it. The alteration of the electrical operation of the door lock can include an alteration of a mechanical feature of the door lock, such as a withdrawal of a dead bolt.

Taken together, the sequence of the illustrative operations in FIG. 3(*a*)-(*c*) shows how the plurality of sensors and electronic devices can enable an inference of whereto the person 333 is moving next, and an adjustment of the operation of specific electronic devices, such that the location is operated at or near an optimum with respect to energy use as well as comfort and functional usage for the person 333.

Next, a number of non-limiting illustrative embodiments of the inference engine 258, its operation, inputs and outputs are provided.

Figure 4:
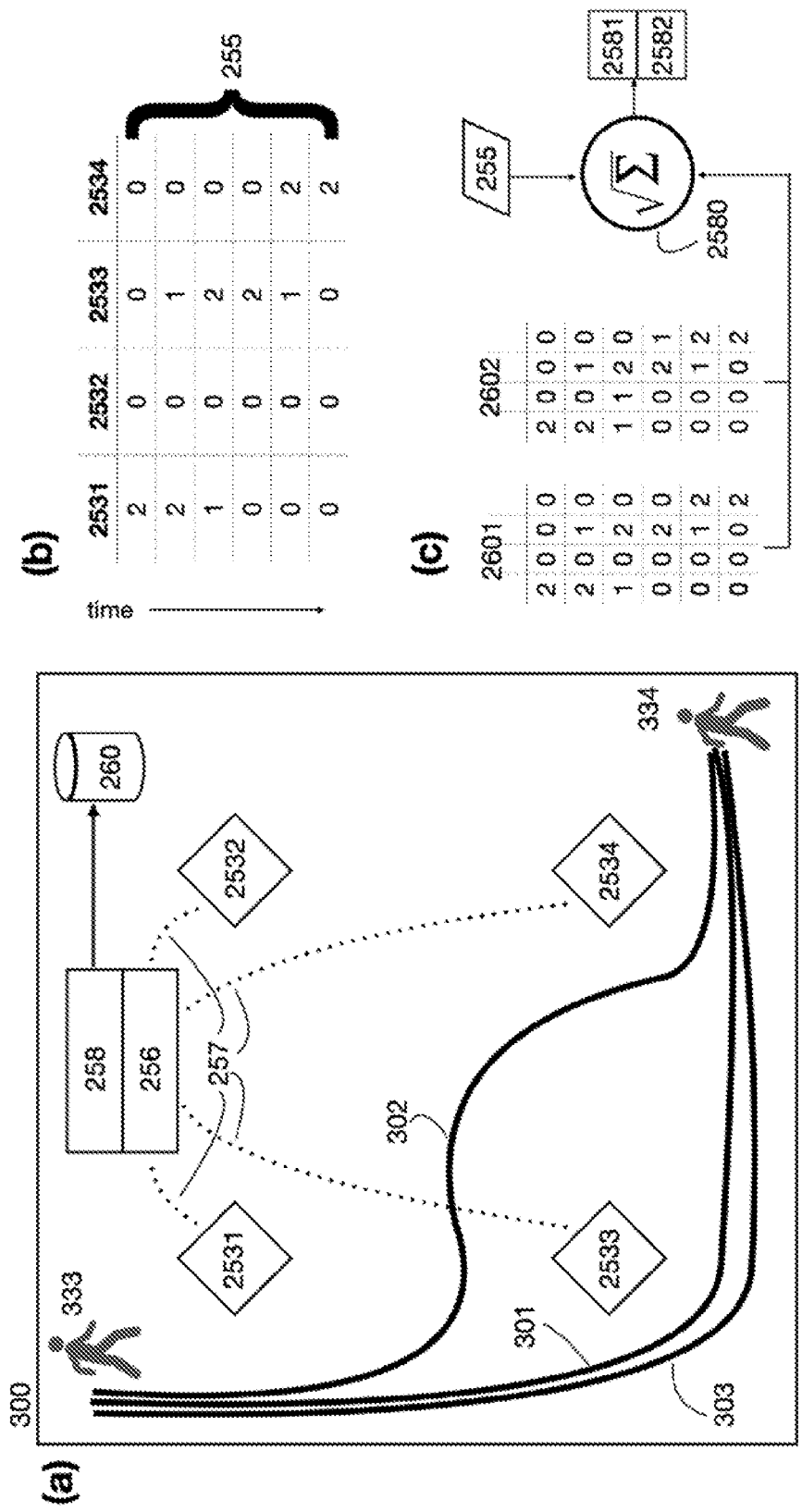
FIG. 4(a)-(c) are illustrations showing FIG. 4(a) a room in which an innovative system of some embodiments described herein is installed and a person is moving from a first corner to a second corner following a path, FIG. 4(b) an example composite data array generated from such movement, which in FIG. 4(c) is computationally transformed into a data representation of an inference about the path of the person and its future according to a first method.

In an illustrative embodiment, shown in FIG. 4(*a*), a person at a first time 333 is walking through a room 300, such that at a second time the person 334 is at another location. The room is equipped with four motion sensors 2531-2534, each can be uniquely identified. The sensors are omnidirectional within a precision threshold, and the amplitude of their signal decreases uniformly with radial distance to the moving person. The signal is of limited resolution and can take values at discrete levels, such as the ascending order 0, 1, and 2. In other embodiments the signal can take values at discrete levels in the ascending order none, weak and strong. Other values and ranges of values can be contemplated.

The four sensors are connected 257 to a joiner device 256. The connection is wireless, such that the motion sensors can be installed by physically mounting them to a surface, such as a ceiling, wall or furniture, but without installing a wire for data communication. The sensors can be integrated within devices that can perform additional function, such as lighting, heating, cooling, smoke detection. The sensors can be electrically powered with batteries. The sensors can be electrically powered by a connection to the electrical grid. The latter means of electrical power can be provided as a fraction of the electrical power provided to the components for lighting or temperature regulation.

The person in the illustrative embodiment is walking along a first path 301 from a first corner of the room to a second corner of the room. The first path is a specific motion pattern. At different points in time the motion sensors interact with a percept along the path, and the composite data array 255 is altered. In the illustrative embodiment six instances of alteration to the composite data array takes place along the first path 301.

The number of interactions with the sensor can depend on a first frequency by which the sensor emits a physical signal to probe its environment for possible motion. The first frequency can be, but is not limited to 100 times every second, 1 time every second, once every 10 seconds. The more frequent the motion sensor probes its environment the quicker new motion can be detected.

The motion sensor can be configured such that it passively probes (e.g., polls) its environment for motion. In another variation, the motion sensor can actively scan given various triggers or logical commands. A variation from its baseline signal above a threshold immediately leads to that the sensor creates a data array to represent the features of the detected motion.

The communication of the sensor data array to the joiner device 256 can depend on a second frequency by which the joiner device polls the plurality of sensors for their respective sensor data arrays. The second frequency can be, but is not limited to 10 times every second, 1 time every second, once every 10 seconds. In other embodiments the sensor sends its data array to the joiner device and interrupts the joiner device in order to update the composite data array.

The plurality of composite sensor data arrays 255 for the person walking along path 301 is illustrated in FIG. 4(*b*), wherein a first row above a second row corresponds to a point in time further into the past. The closer the person is to a given sensor while moving along the path, the greater the magnitude of the corresponding signal. The joiner device 256 is continually appending more recent data arrays to already received ones and thus creates a composite data array of expanding size.

The composite sensor data arrays in FIGS. 4(*b*) and 4(*c*) represent motion patterns in a particular format. Other formats can be contemplated. In FIG. 5(*a*) an abbreviated data array format is illustrated. The amplitude of the motion is denoted with characters W and S. The amplitude is proportional to the radial distance between the person and the motion sensor. The sensor interacting with motion percepts is denoted with its unique identifier after the amplitude character. Distinct sensors interacting with motion percepts concurrently are separated by a comma. Sensor data at different points in time are separated by semicolon. Absence of sensed motion near a sensor is not explicitly denoted, instead indirectly represented by the absence of the corresponding unique identifier.

Other formats of data arrays can be contemplated. The format specifies in what manner information can be embodied as a string, numerical sequence, or other combination of symbols. In practical applications of the system, one format for the data arrays can be preferred because of brevity, legibility, conformity to third-party convention. However, different formats that embody the identical information are interchangeable in the description of the innovative system. Therefore the format of the data array does not materially change the innovation.

The inference engine 258 is in communication with the joiner device 256 and the reference library 260. In the illustrative embodiment, the reference library stores two distinct composite data arrays 2601-2602, shown in FIG. 4(*c*).

In the illustrative embodiment the following steps of logical commands and numerical evaluations are executed by the inference engine as the person walks along the path 301. At a first point in time, the inference engine receives from the joiner device the data array corresponding to the first row of 255. The inference engine proceeds to evaluate a first distance value 2581, which quantifies similarity between the first row of the data array and the data array 2601. The inference engine proceeds to evaluate a second distance value 2582, which quantifies similarity between the first row of the data array and the data array 2602. The distance values are outcomes of a plurality of numeric evaluations between the values of the respective plurality of data arrays as instructed by a mathematical formula, which is referred to as a metric 2580.

The metric 2580 can be, but is not limited to, Euclidean distance, Manhattan distance, Minkowski distance, Hamming distance, Cosine similarity, Levenshtein distance, Damerau-Levenshtein distance, Jaro distance, Longest common subsequence distance, Bray-Curtis distance, Canberra distance, Chebyshev distance, Mahalanobis distance. Other distance metrics can be contemplated, which quantifies a similarity between at least two data arrays as a single value.

In the illustrative embodiment the first row in the data array 255 is evidently identical to the first row in both data arrays 2601 and 2602. The corresponding distance values reflects this high degree of similarity. The high degree of similarity can be quantified with 0, 1, 100%.

On basis of at least these two distance values the inference engine 258 can either make an inference, or not make an inference. In the illustrative embodiment no inference is made since too few data arrays have been received and processed by the inference engine. In other words, too little information has been retrieved about the behavior, and an inference of a sufficient confidence is not possible.

Instead the inference engine is idle until the second point in time, wherein the composite data array is altered by the concatenation of the second row to the first row. New distance values are evaluated in a manner similar to what is described above. That is, the composite data array as it exists at the second point in time, is associated with one or a plurality of distance values that quantifies a degree of similarity to the reference library data arrays 2601 and 2602.

On basis of at least these two distance values the inference engine 258 can either make an inference, or not make an inference. In the illustrative embodiment, no inference is made since too few data arrays have been received and processed by the inference engine. Instead the inference engine 258 is idle until the next composite data array is received from the joiner device. Using the metric 2580, the composite data array as it exists at the third point in time, and the data arrays 2601 and 2602 in the reference library, new distance values are computed.

At this point in time in the illustrative embodiment the inference engine can infer that recent behaviors by the person in the space generate sensor data that differentiate the two reference library data arrays, such that data array 2601 is more similar to recent sensor data than data array 2602. In the illustrative embodiment, the inference engine makes the inference that future sensor data arrays will be identical to the remaining data arrays in the composite data array 2601. In other illustrative embodiments, the inference engine makes the inference that future sensor data arrays will be no more dissimilar from the remaining data arrays in the composite data array 2601 than a threshold.

The matching of an ongoing motion pattern to one or a plurality of reference motion patterns in the reference library can be done such that the ongoing motion patterns does not have to be identical to any reference motion pattern. Embodiments can be contemplated wherein every ongoing motion pattern is different from all reference motion patterns, due to minor differences in how persons move throughout a space, their body size, or the speed of motion.

However, the ongoing motion pattern can be identical within a matching threshold to one or a plurality of the reference motion patterns in the reference library. The inference with respect to an ongoing motion pattern can therefore in some embodiments be comprised of an association of a composite sensor data array to a representative motion pattern, and its reference library data array, rather than an exact match.

In embodiments that associates an ongoing motion pattern to a similar, but not necessarily identical, reference motion pattern, the plurality of data arrays in the reference library can each be representatives of families of cognate motion patterns. In these embodiments, all motion patterns that associate to the same family of motion patterns can lead to the identical inference by the inference engine.

In embodiments of the inference engine that compute associations to representative reference motion patterns, the accuracy of the computation can be measured along two dimensions: sensitivity and specificity.

The sensitivity of the computation quantifies how frequently an ongoing motion pattern is correctly associated to at least a first family of motion patterns. If the matching threshold is too stringent, the person moving through the space can be on a path 303 that should be associated by the inference engine to the same family of motion patterns as the path 301 would. However, due to minor variations in the path, and the stringent threshold, the matching fails. This would reduce the sensitivity.

The specificity of the computation quantifies how frequently an ongoing motion pattern is correctly not associated to at least a first family of motion patterns. If the matching threshold is too permissive, a person moving through the space can be on a path 302 that should not be associated by the inference engine to the same family of motion patterns as motion along the path 301 would. However, due to insufficient variations in the motion patterns, and the permissive matching threshold, the incorrect association is made. This would reduce the specificity.

In some embodiments the sensitivity and specificity are in an inverse proportional relation. In other words, there is a trade-off relation between the two dimensions of accuracy. The sensitivity can be increased by adjusting the matching threshold to become less stringent, more permissive. The same adjustment can be expected to reduce the specificity.

In some embodiments wherein a trade-off relation exists, a greater sensitivity is preferred over a greater specificity. For example, if the predicted motion pattern is used to determine the actuation of a luminaire on the predicted path, the absence of switching on the light on the path of the ongoing motion patterns can be deemed worse than the presence of switching on the light on a path different from the one of the ongoing motion pattern.

In some embodiments wherein a trade-off relation exists, a greater specificity is preferred over a greater sensitivity. For example, if the predicted motion pattern is used to unlock an otherwise password protected computer at the predicted terminal point of the path, the unlocking of the computer when the actual path terminates elsewhere can be deemed worse than on occasion require the person to manually unlock the computer.

In some embodiments additional sensors 253 are installed in the space, or more informative sensor data arrays 254 are generated, or enhanced logical commands and numerical evaluations executed by the inference engine 258 are created, or additional reference motion patterns are added to the reference library 260, such that the trade-off relation between sensitivity and specificity becomes less straining. In these embodiments high sensitivity and high specificity can be attained simultaneously.

Additional sensors 253 installed at additional locations in the space can imply that two or more distinct motion patterns do not give rise to identical (within the matching threshold) sensor data arrays. In an illustrative embodiment that includes only a single motion sensor that is omnidirectional, two motion patterns at the same distance from the motion sensor, but at different angles relative the motion sensor, create the same sensor data array. Therefore, no inference engine can resolve the two distinct motion patterns. Additional motion sensors reduces the number of motion patterns that create identical (within the matching threshold) sensor data arrays.

Additional sensors installed at additional locations in the space can imply a greater cost of the installation and operation of the system. A first system that attains the same accuracy as a second system, wherein the first system has fewer motion sensors is therefore preferred.

More informative sensor data arrays 254 can imply that two or more distinct motion patterns do not give rise to identical (within the matching threshold) sensor data arrays. In an illustrative embodiment, the sensor data array is not only representing the amplitude of the motion as in the embodiment of FIG. 4(*a*)-(*c*), but also a polar angle of the motion relative the sensor.

The illustrative data array in FIG. 5(*b*) includes the '+' and characters to denote the additional specification of the motion in terms of being right or left of an axis of the sensor. That property of the motion can correspond to two ranges of polar angles, such as 0 to 180 degrees, and 180 degrees to 360 degrees, respectively, wherein the two ranges include the lower angle, but not the upper angle, in the range specification.

The illustrative data array in FIG. 5(*c*) includes the 'a', 'b', 'c', and 'd' character to denote the additional specification of the motion in terms of being in one out of four quadrants defined by two orthogonal axes of the sensor. That property of the motion can correspond to four ranges of polar angles, such as 0 to 90 degrees, 90 degrees to 180 degrees, 180 degrees to 270 degrees, and 270 degrees to 360 degrees, respectively, wherein the four ranges include the lower angle, but not the upper angle, in the range specification.

Other ways to denote a more informative data array can be contemplated, such as but not limited to a plurality of ranges of Euler angles, such that motion on two distinct points on a figurative sphere around a motion sensor can give rise to distinct sensor data arrays.

More informative sensor data arrays can imply a more complicated structure of the sensor components. It can also imply that the size or number of data arrays that are transmitted over the coupling 257 increases. That can in turn require more resources are required to manage the data communication. A first system that attains the same accuracy as a second system, wherein the first system has simpler sensor data arrays is therefore preferred.

Additional reference motion patters in the reference library 260 can imply that two or more distinct motion patters that otherwise would have had the minimum distance value to the same reference motion pattern, instead have minimum distance values with two different reference motion patterns. Therefore, the inference engine 258 can associate the two motion patterns to different families of motion patterns, and therefore also make distinct inferences.

Additional reference motion patterns in the reference library can imply that more digital memory is needed to store the plurality of data arrays in the reference library. This can require more expensive electronics components to become part of the system. Furthermore, additional reference motion patterns in the reference library can imply that a greater number of numerical evaluations of the metric has to be done, which can delay the inference, or require more expensive electronics components in order for the time to create an inference to remain below a threshold. A first system that attains the same accuracy as a second system, wherein the first system has fewer reference motion patterns in the reference library is therefore preferred.

Enhancements to the logical commands and numerical evaluations executed on the inference engine 258 can be comprised of a change of metric, such that two or more distinct motion patters have distance values to the reference motion patters of the reference library more congruent with the correct association to families of motion patterns.

Other enhancements to the logical commands and numerical evaluations executed on the inference engine 258 can account for the dilation or compression of signals of the composite data array that two identical paths, but traversed at different speeds, such that the two motion patters, despite numerical scale differences, are associated to the same family of motion patterns.

Other enhancements to the logical commands and numerical evaluations executed on the inference engine 258 can account for that two identical paths, but wherein one case a sensor temporarily transmits an aberrant value due to a brief perturbation by an unrelated event in the space, are still matched to the same family of motion patterns. Other causes of temporary aberrant sensor data arrays can be contemplated, such that a transient blockage of the couplings 257 or 259. Other enhancements can be contemplated.

Enhancements to the logical commands and numerical evaluations executed on the inference engine can imply more onerous numerical evaluations as part of the execution of the logical commands and numerical evaluations of the inference engine, which can delay the inference, or require more expensive electronics components in order for the time to create an inference to remain below a threshold. A first system that attains the same accuracy as a second system, wherein the first system uses a plurality of simpler logical commands and numerical evaluations is therefore preferred.

In some embodiments with a sufficient distribution of motion sensors, a sufficiently informative sensor data arrays, a sufficient range of template or reference motion patterns in the reference library, and with a sufficiently enhanced plurality of logical commands for the inference engine to execute, 100% sensitivity and 100% specificity can be simultaneously attained.

In other embodiments, the logical commands and numerical evaluations executed by the inference engine are intended for the partial behavior prediction to indicate if the behavior in the space is abnormal, or deviates sufficiently from normal. For example, if the person 333 in FIG. 4(a) trips over along the path and stops moving, the composite data array the inference engine processes can deviate from all reference motion patterns in the reference library. In some embodiments the deviation is quantified with a metric and if the plurality of distance values are all greater than a deviation threshold, the inference engine makes the inference that an abnormal behavior has taken place. This embodiment therefore is concerned with a prediction of the meaning of a past behavior.

In embodiments of the inference engine that predicts if a motion pattern indicates abnormal behavior, the accuracy of the prediction can be measured along two dimensions: sensitivity and specificity.

The sensitivity of the prediction quantifies how frequently a truly abnormal behavior is predicted as such. If the deviation threshold is too stringent, the person may trip over or act in otherwise abnormal ways, but the inference fails to predict that since the plurality of distance values are all below the deviation threshold. This would reduce the sensitivity.

The specificity of the computation quantifies how frequently normal behavior is incorrectly predicted as abnormal. If the deviation threshold is too permissive, a person moving through the space in a slightly different way than normal, however not because of abnormal behavior, can be falsely predicted to be engaged in abnormal behaviors. This would reduce the specificity.

In some embodiments the sensitivity and specificity are in an inverse proportional relation. In other words, there is a trade-off relation between the two dimensions of accuracy. The sensitivity can be increased by adjusting the deviation threshold to become less stringent, more permissive. The same adjustment can be expected to reduce the specificity.

In some embodiments additional sensors 253 are installed in the space, or more informative sensor data arrays 254 are generated, or enhanced logical commands and numerical evaluations executed by the inference engine 258 are created, or additional reference motion patterns are added to the reference library 260, such that the trade-off relation between sensitivity and specificity becomes less straining. In these embodiments high sensitivity and high specificity can be attained simultaneously.

Figure 6:
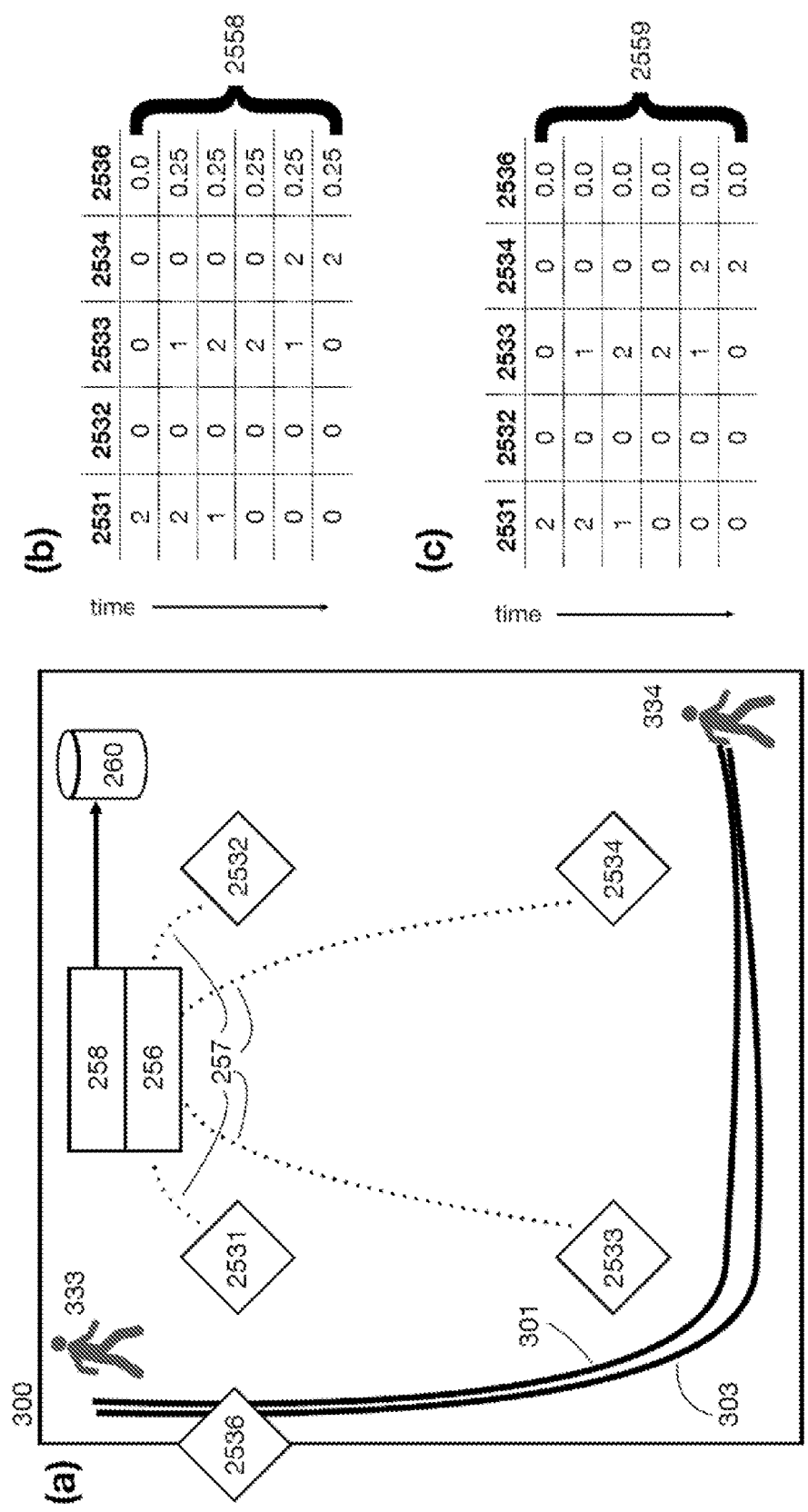
FIG. 6(a)-(c) are illustrations of FIG. 6(a) a room in which a control system is installed, including a slide switch, and a person is moving from a first corner to a second corner following a path, FIG. 6(b) a composite data array from the sensed movement, which is used to establish an inference represented in an updated data structure in FIG. 6(c) about the path of the person and its future according to a first method.

An illustrative embodiment that uses a switch sensor in order to enhance the inference is shown in FIG. 6(a)-(c). In the location 300 the innovative system is installed, including the same plurality of sensors 2531-2534, and joiner device 256, as in the illustrative embodiment described in relation to FIG. 4(a)-(c).

In addition the system includes a switch sensor 2536 installed on the wall near the upper right corner of the room. In the illustrative embodiment, the switch sensor is a slide switch. The slide switch is comprised of a slider, which can be set continuously between a starting position and a terminal position. If the slider is set at the starting position, the slide switch creates a sensor data array comprised of the data value 0.0. If the slider is set one-fourth from the starting position and three-fourths from the terminal position, the slide switch creates a sensor data array comprised of the data value 0.25. If the slider is set at the terminal position, the slide switch creates a sensor data array comprised of the data value 1.0.

The sensor data array from the slide switch 2536 is transmitted over the network to the joiner device 256. The motion sensors, as in the previous illustrated embodiment, also transmits over the network their sensor data arrays at the given point in time to the joiner device 256. As in the previous illustrative embodiment, the sensor data arrays from the motion sensors are comprised of values 0, 1, and 2, depending on if no motion, weak motion, or strong motion, respectively is sensed in the proximity of the motion sensor.

The joiner device 256 constructs the composite data array 2558, see FIG. 6(b). In the illustrative embodiment, the system has executed the following sequence of commands in order to create said composite data array. First motion sensor 2531 detects strong motion due to the presence of person 333. All other motion sensors detect no motion. The slider of the slide switch 2536 is detected to be at the starting position.

At the second instance in time, the first motion sensor still detects strong motion, and motion sensor 2533 is detecting weak motion. The slide switch 2536 has also changed since the previous instance in time, and is transmitting a sensor data array with data value 0.25. This change has come about because person 333 has moved along motion path 301 and along the path moved the slider to be at a position one-fourth from the starting position. The second row of the composite data array in FIG. 6(b) embodies said sensed state of the room.

In subsequent instances in time, person 333 moves along path 301 until they reach the lower right corner of the room. The motion sensors transmit data arrays as described in relation to FIG. 4(a) and FIG. 4(b). In addition to the previous illustrative embodiment, the composite data array contains values from the slide switch, which stays at a constant 0.25 throughout.

In an alternative motion pattern through the room, person 333 moves along path 303 from the upper left corner to the lower right corner of the location. However, in this alternative motion pattern, person 333 behaves differently in that they neglect to move the slider of the slide switch. The slider remains in the starting position during the course of moving along path 303, which is reflected in the different composite data array 2559 in FIG. 6(c).

Because the two composite data arrays are different, despite person 333 moving along two spatially indistinguishable paths, the inference engine 258 can create distinct inferences. In absence of the slide switch and its contribution to the composite data array, distinct inferences cannot be made. In some embodiments, the slide switch indicates the intentions of person 333 to initiate a lengthier work session in the room 300, versus the intentions of person 333 to quickly walk in to collect an item and then to exit the room again. In other words, the additional slide switch sensor can enable an inference to be made that the system in the illustrative embodiment in FIG. 4(a) cannot.

In an illustrative embodiment, shown in FIG. 7(a) the identical setup of motion sensors 2531-2534, joiner device 256, in a space 250 as in FIG. 4(a), and described above is used. A person 333 is walking through the room, and depending on path and point in time, a composite data array 255 is created by the joiner device. The same constraints and properties apply to these components in this illustrative embodiment as the illustrative embodiment in FIG. 4(a)-(c).

The two illustrative embodiments are different with respect to the reference library and the plurality of logical commands and numerical evaluations executed by the inference engine 258, see FIG. 7(c).

The reference data array 2605 in the reference library 260 can be represented as a weighted directed bipartite graph. Each node on the left-hand side 2606 in FIG. 7(c) corresponds to a sensor in the system. Each node on the right-hand side 2607 corresponds to a sensor in the system. The connections 2608 between the two pluralities of nodes corresponds to a transition between the nodes in the direction of the arrow, that is from the left-hand side to the right-hand side. Each connection is associated with a value.

For a first sensor and a second sensor in the system, the certainty by which motion at the first sensor is followed by motion at the second sensor, is related to the value of the connection 2608 between the node on the left-hand side 2606 that corresponds to the first sensor, and the node on the right-hand side 2607 that corresponds to the second sensor.

The logical commands executed by the inference engine includes the numerical multiplication 2584 of the plurality of values of the connections in the reference data array 2605 and the composite data array 255 comprising past sensor data arrays. In some embodiments the multiplication only includes the most recent sensor data array added to the composite data array. The execution of the logical commands returns an output data array 2585.

In other embodiments the reference data array 2605 is comprised of additional nodes and connections. The additional nodes and connections can quantify the certainty that motion at a first sensor of a first magnitude is followed by motion at a second sensor of a second magnitude. For sensors that can record strong and weak motion, the number of nodes on both the left-hand side and the right-hand side doubles.

In other embodiments the additional nodes and connections can quantify the certainty that motion at a first sensor at a first point in time and motion at a second sensor at a second point in time is followed by motion at a third sensor. In these embodiments the inference engine can differentiate between additional motion patterns that are different farther back in time than the most recently recorded sensor output.

The data array stored in the reference library embodies information about typical motion patterns, and the certainty by which a prediction can be made about future motion patterns on basis of past ones. In some embodiments the certainty of any single motion pattern is low. In FIG. 7(a), motion at sensor 2531 can itself not be the basis of a prediction of motion along path 301, or 302. Both of these paths are possible, which in some embodiments is insufficient for the inference engine to make a prediction.

As additional sensor data arrays are sent to the joiner device and the inference engine, a pattern can emerge, which upon multiplication with the reference data array returns a data array that represent a predicted motion with high certainty at one or a plurality of sensor in the system. The inference engine 258 can then make an inference about where to the person is moving in the near future.

Additional reference data arrays in the reference library 260 can imply that two or more distinct motion patters that otherwise would have produced the same prediction by the inference engine 258, instead are the basis of distinct predictions of future motion patterns by the inference engine. In some embodiments, the additional reference data arrays can be indexed on a value of the global state data array 261. The index can be constructed to differentiate between weekends and weekdays, such that the reference data arrays are different between weekends and weekdays. The index can be constructed to differentiate between a normal situation and an emergency situation, such that in an emergency different families of motion patterns and their associations are predicted.

Next a number of non-limiting illustrative embodiments of the rules engine, its operation, inputs and outputs are provided.

Referring again to FIG. 1, the output from the inference engine 258 can be communicated and used as input elsewhere in the system, such as a rules engine 270. The coupling 269 between the inference engine and the rules engine can be comprised of an antenna transmitting and receiving a wave of electromagnetic radiation at 2.4 gigahertz, which through modulation can encode the data array. The coupling and data array can further be embodied to transmit the composite sensor data using the Wi-Fi protocol. Other specified protocols can be used, such as but not limited to Bluetooth™, Thread™, Zigbee™, Z-Wave™, LTE, 4G, 5G. Other proprietary protocols can be contemplated for wireless data transfer.

The coupling 269 can be wired, wherein an electrical signal is transmitted via a conductive medium, such as copper wire or a copper trace in a printed circuit board (PCB) or fibre optics. A coupling can also be wireless. Through a modulation method, such as but not limited to pulse-width modulation (PWM), the data arrays and 263 are communicated between the inference engine 258 and the rules engine. Protocols for wired data transfer, such as but not limited to Ethernet and Universal Serial Bus (USB) can be contemplated.

The coupling 269 can be mediated by secondary devices, such as an Internet router. The rules engine 270 can in these embodiments be physically located far away from the inference engine 258, for example on a server in the cloud. In these embodiments the master device sends the data arrays over connections of the Internet with typical protocols and addresses. Unlike the wireless and wired coupling methods illustrated above, transmission of data arrays over the Internet adds overhead to the method and additional communication latency can be a consequence. An advantage of placing the rules engine 258 in the cloud is that the same computational resources and logical commands and numerical evaluations can be used to process the predicted partial behavior and predicted partial future behavior from a plurality of distinct installations of the system.

The rules engine 270 can be coupled to a rules library 271. The rules library 271 can contain a key-value dictionary that associates a prediction with one or a plurality of operational data arrays 272. An operational data array can be comprised of a unique electronic device identifier and one or a plurality of values, which can be called the data payload. The rules engine can be coupled 274 to one or a plurality of electronic devices 273, such that the data payload can be received by the one or the plurality of electronic devices 273 that corresponds to the unique electronic device identifier.

The coupling 274 can be comprised of an antenna transmitting and receiving a wave of electromagnetic radiation at 2.4 gigahertz, which through modulation can encode the plurality of data arrays. Other frequencies are possible. The coupling and plurality of data arrays can be configured such that the Wi-Fi protocol is used for transmission. Other protocols can be used, such as but not limited to Bluetooth™ Thread™, Zigbee™, Z-Wave™, LTE, 4G, 5G. Other proprietary protocols can be contemplated for wireless data transfer.

The coupling 274 can be wired, wherein an electrical signal is transmitted via a conductive medium, such as copper wire or a copper trace in a printed circuit board (PCB) or fibre optics. Through modulation, such as but not limited to pulse-width modulation (PWM), the plurality of data arrays 272 are communicated between the rules engine and the electronic device or the plurality of electronic devices 273. Protocols for wired data transfer, such as but not limited to Ethernet and Universal Serial Bus (USB) can be contemplated.

The coupling 274 can be mediated by secondary devices, such as an Internet router. The electronic device or plurality of electronic devices 273 can in these embodiments be physically located far away from the rules engine, for example in a space beyond typical wireless communication range. In these embodiments the rules engine transmits the plurality of data arrays over connections of the Internet. In comparison to the wireless and wired coupling methods illustrated above, transmission of data arrays over the Internet adds overhead to the transmission and additional communication latency can be a consequence. An advantage of a remote rules engine 270 is that the same computational resources and logical commands and numerical evaluations can be used to create the plurality of operational data arrays from a plurality of distinct installations of the system.

Other means of coupling that enable transmission of data arrays can be contemplating, including audio waves or light waves.

In some embodiments the plurality of electronic devices are comprised of a plurality of LED luminaires. The data payload can in these embodiments be comprised of a plurality of electrical current values, such as 30 milliamps, 60 milliamps, 100 milliamps. Upon receiving the data payload, an LED luminaire in the plurality of LED luminaires can modify its electrical operation, such that the electrical currents that drive the light-emitting diodes are altered. The luminous flux from the LED luminaire can be proportional to the electrical currents that drive the light-emitting diodes. Therefore, in these embodiments the light output of the luminaire changes after it has received and processed the operational data array.

In some embodiments, the plurality of electronic devices are comprised of a plurality of LED luminaires. The data payload can, in these embodiments, be comprised of a data field representing a luminous flux value, such as 400 Lumens, 600 Lumens or Lumens. Upon receiving the data payload, an LED luminaire in the plurality of LED luminaires can process the data payload and modify its electrical operation, such that the electrical currents that drive the light-emitting diodes are altered, such that the luminous flux of the LED luminaire is equal to the luminous flux value of the data payload. This type of LED luminaire can be called a dimmable LED luminaire.

The change in luminous flux can be an increase, which can be called to "dim up" the LED luminaire. The change in luminous flux can be a decrease, which can be called to dim down the LED luminaire. The change in luminous flux can be a decrease to zero, which can be called to switch off the LED luminaire. The change in luminous flux can be an increase to the maximum luminous flux permitted by the electronic components of the LED luminaire, which can be called to switch on the LED luminaire.

In some embodiments, the optical output of the LED luminaires is a mixture of the optical output from a plurality of light-emitting diodes comprised of three distinct pluralities of light-emitting diodes, wherein the first plurality of light-emitting diodes emits predominately red light, wherein the second plurality of light-emitting diodes emits predominately green light, wherein the third plurality of light-emitting diodes emits predominately blue light. This type of LED luminaire can be called an RGB luminaire.

In embodiments with one or a plurality of electronic devices comprised of RGB luminaires, the data payload can be comprised of three different electrical current values, such as 10 milliamps, 30 milliamps, 50 milliamps. Upon receiving the data payload, the RGB luminaire can modify its electrical operation, such that the first plurality of light-emitting diodes receives a current equal to the first electrical current value, such that the second plurality of light-emitting diodes receives a current equal to the second electrical current value, such that the third plurality of light-emitting diodes receives a current equal to the third electrical current value.

The change of optical output of a RGB luminaire can be perceived by a person in the space as a change in light color. The plurality of operational data arrays can be created by the rules engine such that only few RGB luminaires in the space change color, while the remaining RGB luminaires are emitting the same color as before.

In some embodiments, the optical output of the LED luminaires is a mixture of the optical output from a plurality of light-emitting diodes comprised of four distinct pluralities of light-emitting diodes, wherein the first plurality of light-emitting diodes emits predominately red light, wherein the second plurality of light-emitting diodes emits predominately green light, wherein the third plurality of light-emitting diodes emits predominately blue light, wherein the fourth plurality of light-emitting diodes emits predominately white light. This type of LED luminaire can be called an RGBW luminaire.

In embodiments with one or a plurality of electronic devices comprised of RGBW luminaires, the data payload can be comprised of four different electrical current values, such as 10 milliamps, 20 milliamps, 30 milliamps, 50 milliamps. Upon receiving the data payload, the RGBW luminaire can modify its electrical operation, such that the first plurality of light-emitting diodes receives a current equal to the first electrical current value, such that the second plurality of light-emitting diodes receives a current equal to the second electrical current value, such that the third plurality of light-emitting diodes receives a current equal to the third electrical current value, such that the fourth plurality of light-emitting diodes receives a current equal to the fourth electrical current value.

Systems with electronic devices comprised of RGBW luminaire can create the same modifications to the environment through actuation as RGB luminaire. A RGBW luminaire can in addition create optical output that has greater color rendering index than RGB luminaries. Therefore RGBW luminaires can be preferred in some applications.

In some embodiments the optical output of the LED luminaires is a mixture of the optical output from a plurality of light-emitting diodes comprised of five distinct pluralities of light-emitting diodes, wherein the first plurality of light-emitting diodes emits predominately red light, wherein the second plurality of light-emitting diodes emits predominately green light, wherein the third plurality of light-emitting diodes emits predominately blue light, wherein the fourth plurality of light-emitting diodes emits predominately warm white light (correlated color temperature 3500K or less), wherein the fifth plurality of light-emitting diodes emits predominately cool white light (correlated color temperature 5000K or more). This type of LED luminaire can be called an RGBWC luminaire.

In embodiments with one or a plurality of electronic devices comprised of RGBWC luminaires, the data payload can be comprised of five different electrical current values, such as 10 milliamps, 20 milliamps, 30 milliamps, 40 milliamps, 50 milliamps. Upon receiving the data payload, the RGBWC luminaire can modify its electrical operation, such that the first plurality of light-emitting diodes receives a current equal to the first electrical current value, such that the second plurality of light-emitting diodes receives a current equal to the second electrical current value, such that the third plurality of light-emitting diodes receives a current equal to the third electrical current value, such that the fourth plurality of light-emitting diodes receives a current equal to the fourth electrical current value, such that the fifth plurality of light-emitting diodes receives a current equal to the fifth electrical current value.

Systems with electronic devices comprised of RGBWC luminaire can create the same modifications to the environment through actuation as RGB luminaire and RGBW luminaire. A RGBWC luminaire can in addition create optical output that has greater color rendering index than a RGB luminarie or a RGBW luminaire. Therefore RGBWC luminaires can be preferred in some applications.

Changes to the current of a RGB luminaire or a RGBW luminaire or a RGBWC luminaire can be called color tuning.

In some embodiments, the plurality of electronic devices is comprised of a plurality of connected lighting switches. The data payload can, in these embodiments, be comprised of a plurality of Booleans that indicate the power state of respective circuits. Upon receiving the data payload, a light switch in the plurality of light switches can modify its electrical operation, such that the electrical current is switched on or off. Therefore, in these embodiments the light output of the connected circuit changes after it has received and processed the operational data array.

In some embodiments, the plurality of electronic devices is comprised of a plurality of connected dimmer switches. The data payload can in these embodiments be comprised of a plurality of percentage values, such as 30 percent, 60 percent, 100 percent. Upon receiving the data payload, a dimmer switch in the plurality of dimmer switches can modify its electrical operation, such that its method of dimming the lights connected to its circuit is altered. The method of dimming in some embodiments can be triac dimming compatible with incandescent or LED lights. The method of dimming in some embodiments can be adapting the percentage to a voltage in the range of 0 to 10V proportional to percentage. This voltage can be used to control a variety of lighting control apparatuses. Therefore, in these embodiments the light output of the lights controlled by the dimmer switch changes after it has received and processed the operational data array.

In some embodiments, the plurality of electronic devices can be comprised of a plurality of heating, ventilation, air conditioning (HVAC) devices, such as radiators, vents, air conditioners, humidifiers, and dehumidifiers. The data payload in these embodiments can be comprised of a temperature value, air flow value, or relative humidity value, such as 22 centigrade, 400 cubic feet per minute, 50%. Upon receiving the data payload, the HVAC device changes its internal operation. In some embodiments the change is comprised of an increase in electrical current, such that more heat is generated. In other embodiments the change is comprised of an increase in electrical current, such that one or a plurality of fans rotate faster. In other embodiments the change is comprised of an angle a window should be opened. In other embodiments the change is comprised of a rate to flow a refrigerant gas. These are details of the internal operations of the HVAC device that the innovative system can be indirectly specifying through target temperature, airflow and humidity, instead of directly specifying.

In some embodiments, the plurality of electronic devices can be comprised of controllable home appliances, such as coffee makers, slow cookers, robotic vacuum cleaners. The data payload in these embodiments can be comprised of an instruction to switch on or to initiate a pre-programmed routine. The home appliance thus performs some function that alters the environment, wherein some amount of time is required to complete the function.

In some embodiments the plurality of electronic devices can be comprised of devices for home entertainment, such as a television or speaker system. The data payload in these embodiments can be comprised of an instruction to switch on a specific program or music tune.

In some embodiments the plurality of electronic devices can be comprised of mobile robots capable of complex physical action, such as lifting or moving heavy or fragile objects. The data payload in these embodiments can be comprised of an instruction to move to a particular location within the space, defined by its relation to the plurality of sensors in the system, and at said location perform an action, such as assisting a person.

In some embodiment the plurality of electronic devices can be equipment that can transmit data arrays to audiovisual devices capable to display informative messages or warning messages, such as a smartphone or computer screen, at a location remote to the space for which the inference engine created a prediction. The data payload in these embodiments can be a text string describing a prediction created by the inference engine, which when received by a particular audiovisual device can inform a person of an event in the space, information which can prompt the person to take action to change the environment of the space. The equipment in the space can be an internet connected router.

Other types of electronic devices can be contemplated. Their key property of the plurality of electronic devices is that they can be actuated by one or a plurality of data arrays, and that they directly or indirectly bring about a change of the environment of the space in which one or a plurality of sensors of the system are installed.

The control system of FIG. 1, and its operation, as described above can therefore on basis of behavior in a space, control or adjust the environment in said space. The control or adjustment can be automatic. The inputs to the systems can be such that they do not reveal privacy sensitive information of the person in the space. The plurality of sensor outputs considered as a unit, rather than as many separate data points, enables accurate predictions of partial behaviors.

A number of non-limiting illustrative embodiments of all components of the system, from sensors to actuators, part of physical electronics and hardware structures, working in concert are provided next.

In one embodiment of the system and its operation, the system is comprised of a plurality of dimmable LED luminaire. Within the housing of each dimmable LED luminaire, a motion sensor and an antenna are installed. Therefore, each dimmable LED luminaire is capable of detecting local motion, and capable of communicating the corresponding sensor data array through wireless transmission.

A current light level value is defined for each LED luminaire. The current light level is a signal linked directly to the power supply unit hardware within each dimmable LED luminaire and governs the power consumed and ultimately the amount of light emitted. In this approach, it is assumed nearly instantaneous action of the hardware to deliver the amount of light according the current light level value.

A second value is defined as the desired light level. This value is data input each dimmable LED luminaire can receive through its antenna. The control of the current light level for each dimmable LED luminaire follows the sequence:

a. Continually monitor the difference between the desired and current light levels. If there is a difference then evaluate the mutually exclusive conditional of steps b and c.
b. If the desired light level is higher than the current light level then the dimmable LED luminaire is instructed to increase the brightness, or to dim up. The actuation is executed by a gradual increase of the current light level, one step at a time at a first rate. The first rate is such that a person in the room can get the desired illumination in fairly short order, such as within three seconds.
c. If the desired light level is less than the current light level then the dimmable LED luminaire is instructed to decrease the brightness, or to dim down. The actuation is executed by a gradual decrease of the current light level, one step at a time at a second rate. The second rate is slower than the first rate, and such that the diminishing of the light is not easily perceived. The rate could, for example, be set such that the lighting device dims down over the course of 30 seconds.
d. Go back to step a.

Figure 8:
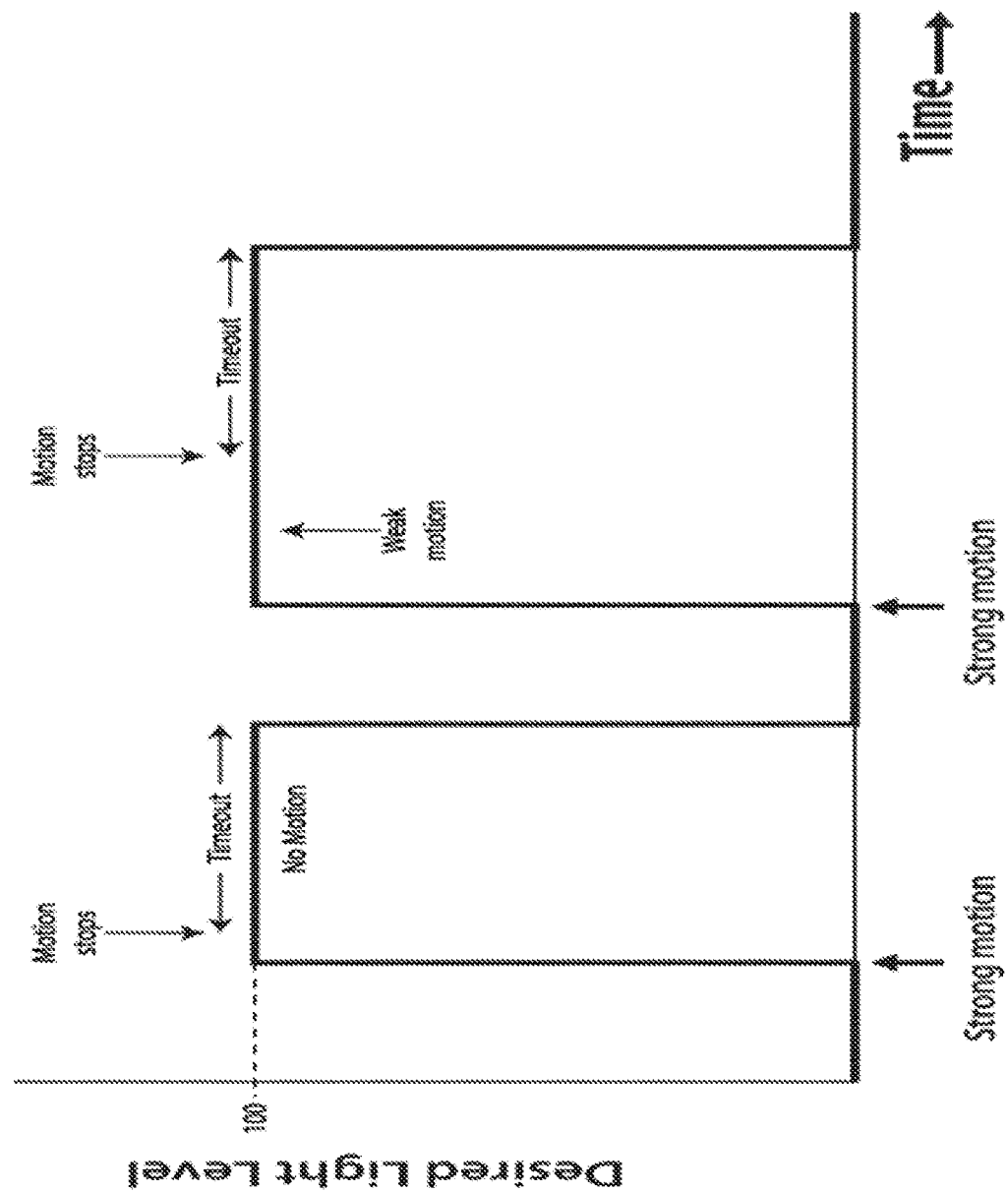
FIG. 8 is an illustrative graph that shows the desired light level as a function of time over the course of several turn-on and turn-off events. The light turns on and enters a "locked-on" state if strong motion is sensed. The "locked-on" state is deactivated and the light turns off if no motion is sensed for a timeout period.

The dimming method is illustrated in FIG. 8. A plurality of dimmable LED luminaires and their operation of this kind can ensure smooth brightness transitions. Despite erratic motion patterns, in this embodiment the change to the environment through actuation of the plurality of LED luminaire is smooth.

This embodiment of the system executes logical commands as follows during operation:

a. When a sensor in a dimmable LED luminaire detects local motion, and characterize it as strong motion, the desired light level of the dimmable LED luminaire is set to full. As described above, this actuation makes the dimmable LED luminaire dim up. The lighting device goes into a "locked-on" state. A timer is set to zero and starts to count up.
b. If a dimmable LED luminaire is in a locked-on state and if location motion is detected, characterized as either weak or strong, then the timer is reset back to zero and continues counting up.
c. If the timer reaches a timeout value, indicating that no weak or strong local motion has occurred for quite some time, then the locked-on state is deactivated and the desired light level is set to zero. The timeout period, for example, is 15 minutes.

Figure 9:
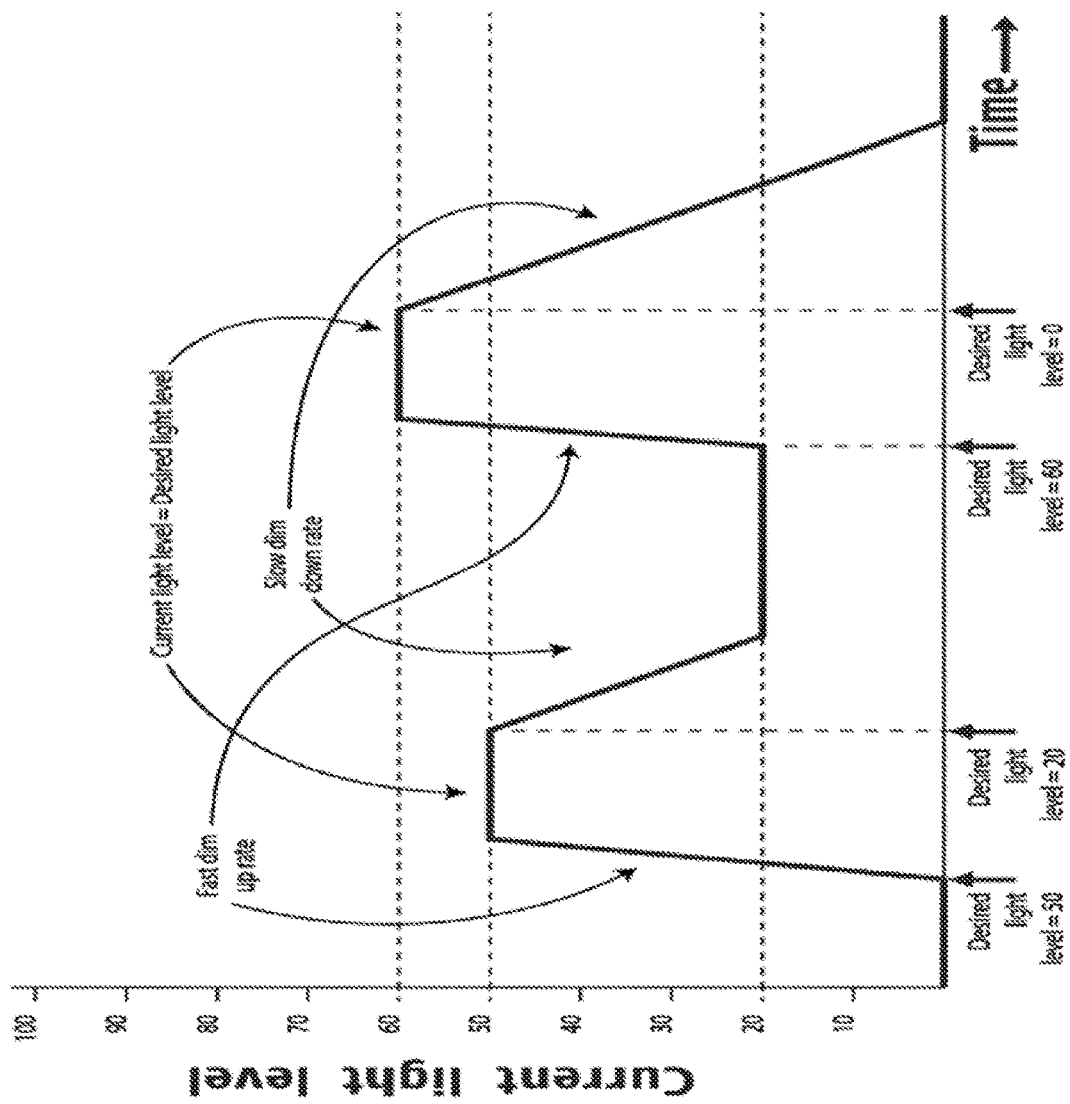
FIG. 9 is a diagram showing a current light level as a function of time given a periodically changing desired light level input, according to some embodiments.

The sequence of commands are illustrated in FIG. 9.

In this embodiment the sensors, electronic devices, inference engine and rules engine are all contained within the same hardware unit. The data arrays are therefore rapidly transferred between the logical command executions.

In this embodiment the inference is relatively simple in nature. Local motion is inferred to mean a person is in the vicinity of the dimmable LED luminaire and therefore in need of illumination. An extended absence of local motion is inferred to mean a person is not in the vicinity of the dimmable LED luminaire and therefore the luminous flux can be dimmed down until it reaches zero.

In this embodiment the joiner device performs no function, since the inference and actuation is made with respect to each dimmable LED luminaire by itself.

In another illustrative embodiment, the system is comprised of a plurality of dimmable LED luminaire. Within the housing of each dimmable LED luminaire, a motion sensor and an antenna are installed. Therefore, each dimmable LED luminaire is capable of detecting local motion, and capable of communicating the corresponding sensor data array through wireless transmission.

In this embodiment, the reference library stores a weighted directed bipartite graph, as described in relation to FIG. 7(a)-(c). The actuation of a dimmable LED luminaire in the system is determined as follows:

a. When a first sensor in a dimmable LED luminaire detects local motion, the desired light level of the first dimmable LED luminaire is set to full. As described above, this actuation makes the dimmable LED luminaire dim up. The lighting device goes into a "locked-on" state. A first timer is set to zero and starts to count up.
b. A second dimmable LED luminaire in the system, for which the associated motion sensor is not detecting any local motion, the desired light level is set as follows: the one pair of nodes in the weighted directed bipartite graph with the first sensor on the left-hand side and the second sensor on the right-hand side is retrieved from the reference library. The associated weight, if non-zero, is multiplied by a factor. That product is the desired light level unless the current light level of that dimmable LED luminaire is greater. A second timer is set to zero and starts to count up.
c. Steps a and b are repeated for all sensors in the system that detect local motion.
d. If the first timer for a dimmable LED luminaire exceeds a first threshold, the LED luminaire begins to dim down. If the second timer for a dimmable LED luminaire exceeds a second threshold, the LED luminaire begins to dim down.

The first threshold can be greater than the second threshold.

Figure 10:
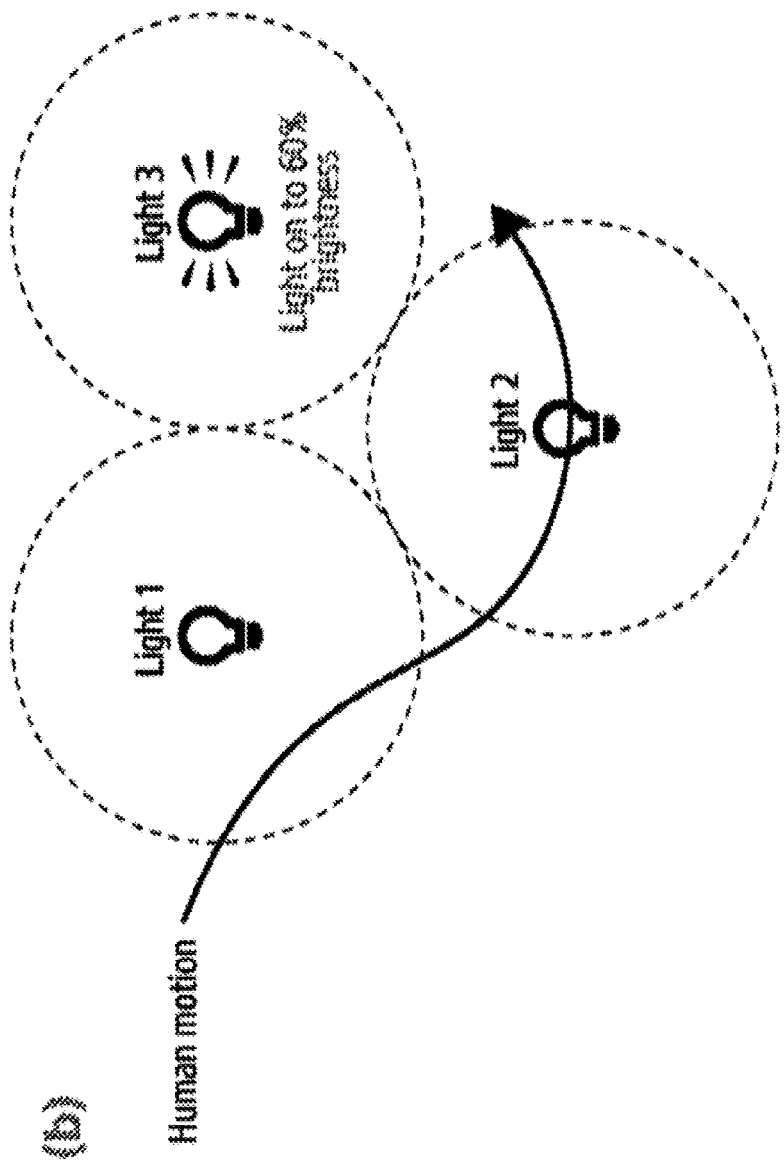
FIG. 10(a)-(b) are illustrations showing an illustrative scenario where three lights is shown, where light control activities specifically for light 3 are examined. The relevant variables and initial states are given in FIG. 10(a).

The steps are illustrated in FIG. 10(a) and FIG. 10(b). The inference engine in this illustrative embodiment predicts local motion means a person is near and in need of illumination. Furthermore, the inference engine in this illustrative embodiment predicts local motion at a first sensor that is in a heavily weighted relation with a second sensor in the weighted bipartite graph in the reference library, means a person is likely to be near to the second sensor in the near future, and then in need of illumination.

The rules engine associates these predictions with different light levels. Present motion near a first sensor leads to full actuation of the dimmable LED luminaire. Predicted future motion near a second sensor leads to a fractional actuation of the dimmable LED luminaire proportional with the confidence of the prediction. Therefore, the dimmable LED luminaires light up ahead of one or a plurality of likely paths.

In addition, the inference engine and the rules engine are quicker to correct for adjusted illumination on predicted paths that did not materialize. A second dimmable LED luminaire that was fractionally actuated and dimmed up to a low, but non-zero, desired light level, however no local motion was detected by its associated motion sensor, dims down to zero quickly.

System for Learning Automatic Operation

The system operation described in the previous section through illustrative embodiments shows how a behavior leads to a useful change of the environment. The operation depends on the execution of logical commands and numerical evaluations part of the inference engine and rules engine, as well as data arrays in the reference library and rules library.

In some embodiments, the logical commands and library data arrays can be set during manufacturing of the components of the system, such that they apply to all particular installations of the system for the entire lifespan of the systems.

In other embodiments, the logical commands and library data arrays can be set during installation of the system in a particular space by the specialist installer, such that the logical commands and library contents apply to the particular installation of the system for the entire lifespan of the particular installation of the system.

In other embodiments, the logical commands and library data arrays can be set at a first point in time by a user of the system, or a designated manager of the system, following the installation of the system in a particular space, through a user-interface designed for that purpose, such that any particular logical commands and library contents apply to the particular installation of the system until they are reset at a second point in time during the lifespan of the particular installation of the system.

In some embodiments, the logical commands and library data arrays can be automatically set during the usage of a particular installed system. The logical commands and library data arrays can therefore be learnt over a duration of use, such that the logical commands and library data arrays apply to the particular installation of the system for a duration in which they fit an operational objective, which is indirectly ascertained from how the system is used. The logical commands and library data arrays can therefore require no manual configuration by a person, rather they are automatically adapted to the particular installation of the system and the usage of said installation.

In some embodiments, the logical commands and library data arrays can be set through a combination of methods, such that an execution of the inference engine or the rules engine can involve a plurality of logical commands and library data arrays of different provenance. In some embodiments, the logical commands and library data arrays are initially set at manufacturing or installation, and only after a duration of use substituted for logical commands and library contents learnt from the usage of the particular installation of the system.

The embodiments wherein all or some of the logical commands and library data arrays are learnt, comprises a system that can create operational rules for a control system of a plurality of electronic devices. The embodiments wherein all or some of the logical commands and library data arrays are learnt, can utilize a method that can create operational rules for a control system of a plurality of electronic devices. Illustrative embodiments of these systems and methods are described below.

In the illustrative embodiment, shown in FIG. 11(a)-(c), a room 600 contains a plurality of sensors 6531-6536 and a plurality of electronic devices 6731-6732. The plurality of sensors are installed at a plurality of locations in the room. The plurality of sensors can interact with percepts that are consequences of human behavior in the room. The human behavior can be motion, such as a person 633 moving along a path in the room.

In some embodiments the plurality of sensors can include motion sensors. A motion sensor in the plurality of sensors can detect and characterize local motion. That means motion that is beyond a sensor distance threshold from the location of the motion sensor is not detected and characterized by the motion sensor. The sensor distance threshold can be a radius of 2 meters, a radius of 5 meters, a radius of 20 meters. The sensor distance threshold can be further limited by objects near the sensor, such as walls, furniture, and doors.

A motion sensor can employ motion sensor technology such as Passive Infrared (PIR) technology, Doppler radar microwave, Doppler radar ultrasonic wave, Tomographic motion detection. Other motion sensor technology can be contemplated.

In other embodiments the plurality of sensors can include a low-resolution microphone. The microphone can interact with mechanical air waves, which can be percepts to spoken words, music, or colliding objects. Waves within a range of frequencies and amplitudes induce vibrations of a membrane, a motion that in turn generates an electrical signal.

In other embodiments the plurality of sensors can include ambient light sensors. The light waves in the room that reaches a detector surface of the sensor interact with a solid-state material with the property that charge is conducted only if light within a range of frequencies lands on said material.

In other embodiments the plurality of sensors can include switches. The switch can interact with forces exerted by the person, either through gravitational pull towards a supporting surface like floor or seat, or by touching, pressing or twisting a component of a sensor. The switch can be a press button switch, rotary switch, slide switch, toggle switch, rocker switch, key lock switch, a combination of switches. Other switch technology can be contemplated.

The plurality of sensors 6531-6536 and the plurality of electronic devices 6731-6732 are coupled to other components of a control system, such that they can transmit and receive data arrays. The other components are not shown in FIG. 10(a), but they can include programmable integrated circuit able to execute logical commands and numerical evaluations, and a memory that can store data arrays. There can be one or a plurality of integrated circuits in the system. There can be one or a plurality of memories in the system.

The plurality of electronic devices can be comprised of a plurality of LED luminaires, a plurality of door openers, a plurality of electrical power regulators, a plurality of HVAC devices, among others, or various combinations thereof. The plurality of electronic devices can be manually enacted through pressing one or a plurality of buttons, using a touch screen interface, or through voice commands. The plurality of electronic devices can be automatically enacted by the transmission of one or a plurality of operational data arrays from a rules engine to the plurality of electronic devices.

Once the system has been installed, the control system can be operated as described in a previous section, in particular in relation to the illustrative embodiment in FIG. 4. The reference library and rules library can contain a plurality of reference data arrays and rules. The reference library and rules library can contain a plurality of basic reference data arrays and rules, which leads to simple automatic control. The reference library and rules library can be empty, and no automatic control is part of the system operation.

The system can in addition have a tentative association library 660, which can be stored in a data repository as a set of data objects having relational fields thereof. Logical commands can over the course of usage of the system accumulate in the tentative association library. Conditional on a confidence level, the commands stored in the tentative association library can become the basis of new content for the reference library and the rules library.

In FIG. 11(b) a composite data array 6551 with an actuation event at the end is shown. In the illustrative embodiment the actuation event is the activation of the electronic device 6731. The composite data array is comprised of a plurality of sensor data arrays. The tentative association library 660 is empty.

The plurality of sensor data arrays comprising the composite data array can be created as described in the previous section in relation to FIG. 1 and FIG. 4. That is, the plurality of sensors interacts with the percepts generated by a person 633 moving along a path 601. The plurality of sensors can be motion sensors that detect and characterize motion in the vicinity of the motion sensor. The motion sensors can be omnidirectional within a precision threshold, and the amplitude of their signal decreases uniformly with distance to the moving person. The signal is of limited resolution and can take values in the ascending order 0, 1, and 2. In other embodiments the signal can take ascending values none, weak and strong. Other values and ranges of values can be contemplated.

At some point in time the person manually activates the electronic device 6731. That can involve switching on one or a plurality of LED luminaires. That can involve opening a door and walk into a neighboring room. Other electronic devices can be contemplated.

The system records the manual activation. The system furthermore records the composite data array comprised of sensor data arrays from the time leading up to the manual activation of the electronic device. The pair of composite data array and actuation event is stored in the tentative association library. The pair is assigned a confidence level 6801.

The confidence level can be a percentage, such as 10%, or 100%. The confidence level can be a fraction between zero and one, such as 0.1 or 1.0. The confidence level can be a descriptive string, such as "weak" or "very high".

At a future point in time, a person is moving in the room. As before the plurality of sensors interacts with the person's behavior. In the illustrative embodiment the person is again moving along the path 601 towards a specific electronic device 6731. As before, the person manually activates the electronic device 6731. The system records the manual activation. The system furthermore records the composite data array comprised of sensor data arrays from the time leading up to the manual activation of the electronic device.

The tentative association library is not empty. The pair of composite data array and actuation event is compared against any stored pair that includes the same actuation event. In the illustrative embodiment in FIG. 11(c), the first pair 6553 of composite data array and actuation is selected, while the second pair 6554 of composite data array and actuation is not selected.

The system computes a degree of similarity between the composite data array 6552 and the composite data array 6553, which quantifies how much alike the two data arrays are. The degree of similarity is an outcome of a plurality of numeric evaluations between the values of the respective data arrays as instructed by a mathematical formula, which is referred to as a metric.

The metric can be, but is not limited to, Euclidean distance, Manhattan distance, Minkowski distance, Hamming distance, Cosine similarity, Levenshtein distance, Damerau-Levenshtein distance, Jaro distance, Longest common subsequence distance, Bray-Curtis distance, Canberra distance, Chebyshev distance, Mahalanobis distance. Other distance metrics can be contemplated, which quantifies a similarity between at least two data arrays as a single value.

In case the degree of similarity is less than a threshold, the data arrays are deemed dissimilar. That is, a new behavior leading up to the actuation event has been detected and characterized. The pair 6552 of composite data array and actuation event are added to the tentative association library. The pair is assigned a confidence level. The confidence level can be a percentage, such as 10%, or 100%. The confidence level can be a fraction between zero and one, such as 0.1 or 1.0. The confidence level can be a descriptive string, such as "weak" or "potential".

In case the degree of similarity is greater than or equal to a threshold, the data arrays are deemed to be similar or identical within the precision limits of the practical application. That is, an already observed behavior leading up to the actuation event has been detected and characterized once more. This is indicative of a stronger association between a particular behavior and actuation.

Hence, the assigned confidence level of the pair 6553 can be modified by a factor or step function, or other type of function. In some embodiments the factor is an increase of the confidence level by one fourth, by one third, by half. In other embodiments the step function modifies the string value from "weak" to "medium", or "potential" to "weakly significant". Other transformations can be contemplated.

In some embodiments, the composite data array of 6552 and 6553 are deemed to be similar, but not identical. The greater the threshold, the farther from identical the two composite data arrays can be, but still be deemed similar. In this case, not only can the confidence level in the tentative association library be modified, but so too the composite data array. In some embodiments an interpolation between the values in the two composite data arrays is evaluated. The composite data array obtained from the interpolation replaces the composite data array in the tentative association library. Any future calculations of degree of similarity can include the interpolated composite data array instead.

At a future point in time, a person is moving in the room again. As before the plurality of sensors interacts with the person's behavior. In the illustrative embodiment the person is again moving along the path 601 towards a specific electronic device 6731. As before, the person manually activates the electronic device 6731. The system records the manual activation. The system furthermore records the composite data array comprised of sensor data arrays from the time leading up to the manual activation of the electronic device.

As before, the tentative association library is not empty, and the steps described above are repeated. However, since the assigned confidence level has been increased already, the increase can go further than before. The assigned confidence level of the pair 6553 can be increased by a factor or step function, or other type of function. In some embodiments the factor is an increase of the confidence level by one fourth, by one third, by half. In other embodiments the step function modifies the string value from "medium" to "very high", or "weakly significant" to "presumable". Other transformations can be contemplated.

In some embodiments, if the confidence level has been sufficiently increased, content from the tentative association library can be the basis of the automatic creation of a data array or a plurality of data arrays to be put into the reference library, as well as a data array or a plurality of data arrays to be put into the rules library.

Figure 11:
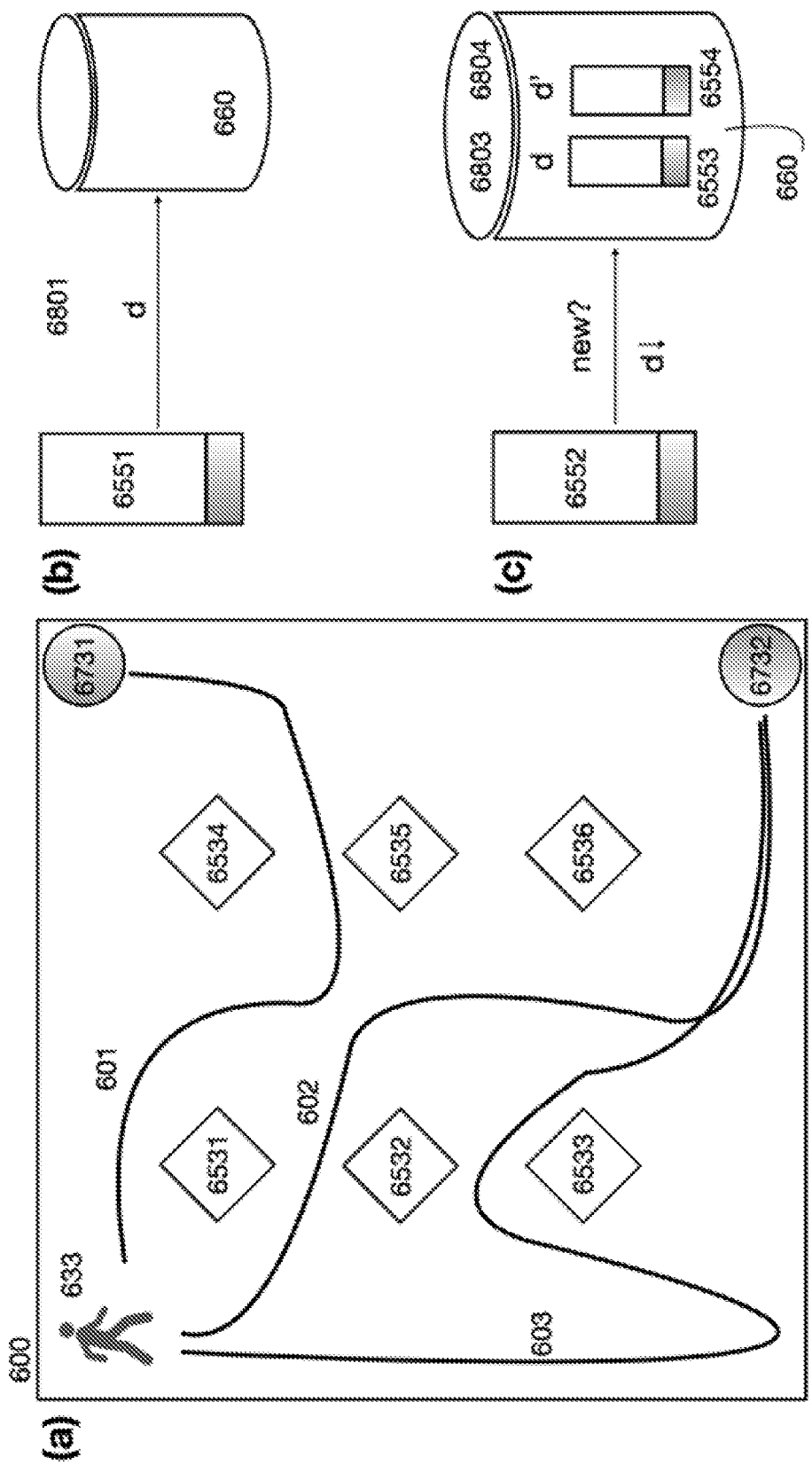
FIG. 11(a)-(c) are illustrations showing a scenario of FIG. 11(a) a room in which an innovative system of some embodiments is installed and a person is moving following a plurality of paths over a duration of time, FIG. 11(b) wherein the sensor signals are stored as a composite data array at a first instance in time, and FIG. 11(c) wherein the sensor signals are compared against stored composite data arrays and the latter conditionally modified at a second instance in time.

In the illustrative embodiment in FIG. 11(*a*)-(*c*), the data array of the pair 6553 can be stored or recorded into the reference library. As described in a previous section, that means that the control system can recognize the associated motion pattern and predict a partial future behavior. That can include the prediction that the person is moving towards the electronic device 6731.

The rules library can be updated with the actuation event of the pair 6553. The key for this new key-value entry to the rules library can be the predicted partial future behavior for the composite data array of 6553.

With these two updates to the reference library and the rules library, the control system operation can proceed as follows: The person 633 starts moving along path After walking on the path for some time, but before arriving at the location of the electronic device 6731, the control system predicts the future behavior and the rules engine activate the electronic device automatically. The system has learnt a behavior and rule from how the person behaves in the room.

In other embodiments, the update to the reference library is preceded by a transformation of the data array from the tentative association library to a compressed form. The compression can lead to losses of information in the composite data array, however, if losses are small, the advantages of smaller sizes of the data arrays can make this a preferred method. Compression can be done through a projection of the data array onto a lower dimension, or through clustering.

Methods of clustering or projection can be, but is not limited to, Principal Component Analysis (PCA), kernel PCA, generalized discriminant analysis, Sammon mapping, k-means clustering, affinity propagation, agglomerative clustering, t-distributed stochastic neighbor embedding. Other methods of clustering or projection can be contemplated.

The learning method can create multiple reference data arrays and rules. In the illustrative embodiment of FIG. 11, the person 633 can move along another path 602 as well in order to reach another electronic device 6732. Following the steps of the method as described above, the degree of tentativeness can be sufficiently reduced as the person is walking along the path 602 in order to reach the electronic device a number of times. The content of the tentative association library is used to construct a second reference data array for the reference library and a second rule for the rules library.

The learning method can create multiple reference data arrays and rules involving the same electronic device. In the illustrative embodiment of FIG. 11(*a*), the person can move along another path 603 in order to reach the same electronic device as path 602. Following the steps of the method as described above, the degree of tentativeness can be sufficiently reduced as the person is walking along the path in order to reach the electronic device 6732 a number of times. The content of the tentative association library is used to construct a third reference data array for the reference library and a third rule for the rules library.

In some embodiments, the memory used for the reference library and rules library is of limited size. Therefore, in this example embodiment, only a set number of references and rules can be stored. In the illustrative embodiment, paths 602 and overlap at the end, shortly before reaching the electronic device 6732. The second and third reference data array can in some embodiment be merged into one data array. The merged data array only accounts for the sensor data arrays that correspond with the final part of the two paths.

With this update to the reference library and rules library, the control system operation can proceed as follows: The person 633 starts moving along path 603. The electronic device 6732 is not activated, since the reference library does not contain a reference data array that is sufficiently similar. After walking on the path for some time, approaching the area between sensors 6533 and 6536, but before arriving at the location of the electronic device 6731, the control system predicts the future behavior and the rules engine activate the electronic device automatically. The system has learnt a behavior and rule from how the person behaves in the room.

If the person 633 instead starts moving along path 602, the same actuation event takes places once the person is approaching the area between sensors 6533 and 6536, but before arriving at the location of the electronic device 6731. This is accomplished with the same reference data array and the same rule as if the person moved along path 603. The memory required is therefore reduced.

If a person 633 reliably moves along a path 601, which has been associated with the actuation of electronic device 6731, but once on every tenth occasion the person turns around because the person has forgotten something, then the control system can create an actuation that under ideal operation should not have taken place. The learning method can note this and weaken the confidence level in the inferred prediction.

If a person changes behavior, and the motion along a path 601 stops entirely to be associated with actuation of electronic device 6731, then the confidence level in the inferred prediction will further decrease. At some point the confidence level is below a threshold, and the rules engine can stop to associate any actuations with the prediction. The prediction has become stale, and it can be removed.

The learning method can be configured to balance removing an association between predicted behavior and an actuation. A removal only if the confidence is very low, can lead to that many actuations are performed despite that they ideally should not. A removal if the confidence is only moderately lower than the highest possible, can lead to that the control system discards or ignore valid predictions. The control system sensitivity and specificity can be in a trade-off relation with respect to the conditions under which a prediction and actuation is no longer associated.

Figure 7:
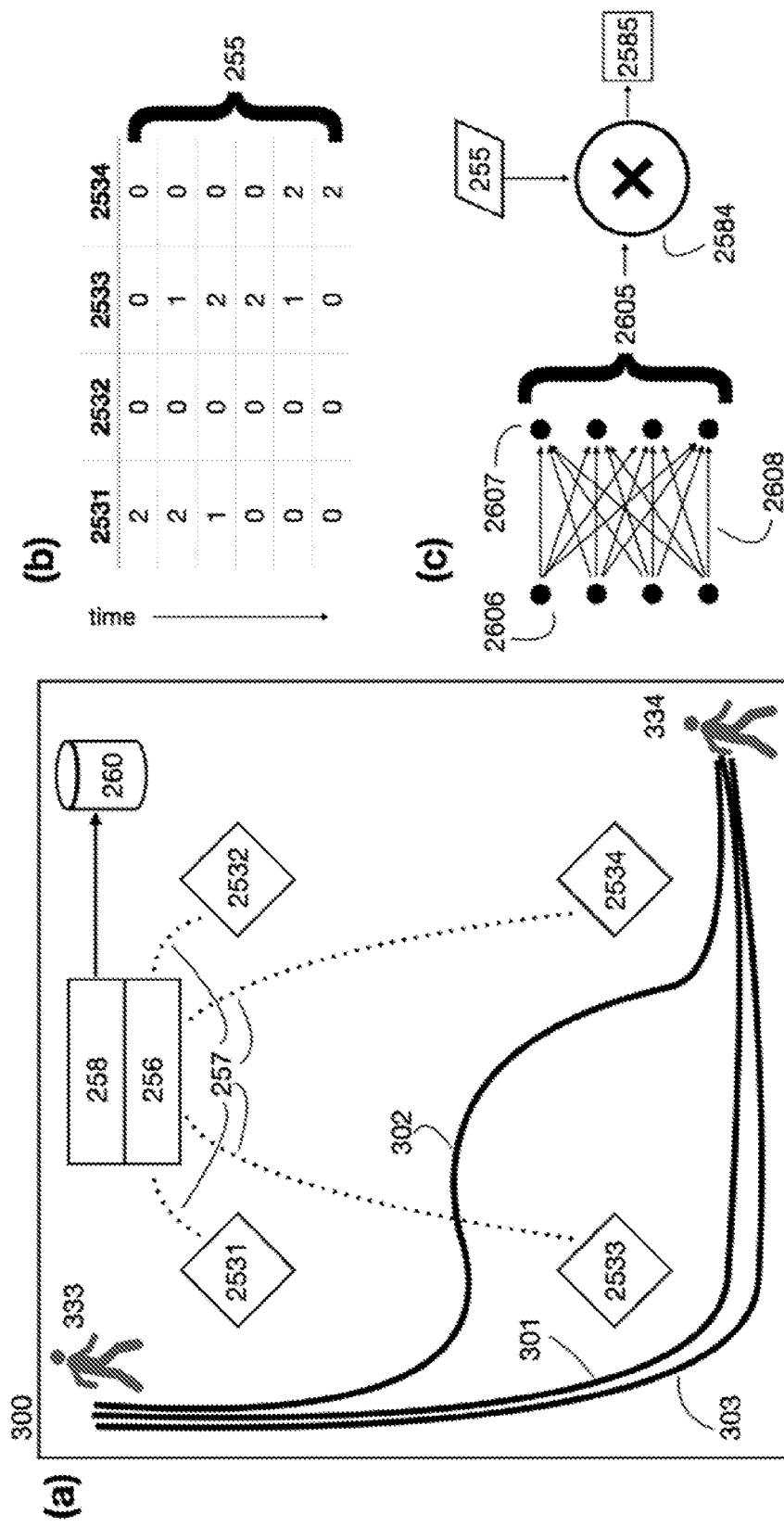

In other embodiments, an automatic learning of the weights in the weighted directed bipartite graph of FIG. 7 can be done. As described in relation to FIG. 7, the weights determines the prediction of the partial future behavior, which can be used to predict where a person is going to move next in a space on account of how the person has moved before.

In an illustrative embodiment, the sensors as motion sensors that detect weak and strong local motion.

For a first sensor in the system, the following steps are executed:
   a. When there is no strong or weak motion for a set "cool down" period, for example five minutes, then the system sets a flag. This flag acts as an activation for learning and prevents frequent and repetitive motion events from causing spurious learning.
   b. If there is motion at a second sensor, other than the first sensor, and the flag is set, then the system can initiate a countdown timer (with a duration of, for example, 20 seconds).
   c. If the countdown timer reaches zero, then the system clears the flag and decrease the weight associated with the pair of the first sensor and the second sensor. The system returns to step (a).
   d. If local strong motion is sensed by the first sensor, and the flag is set, then the system is configured to clear the flag, set the countdown to zero, and increase the weight associated with the pair of the first sensor and the second sensor. The system state returns to step (a).

The steps are repeated for all sensors in the system.

After a number of training iterations, the plurality of weights of the weighted directed bipartite graph converge on a probability, which indicate the frequency by which motion at a first sensor in the system is followed by motion at a second sensor in the system.

Figure 12:
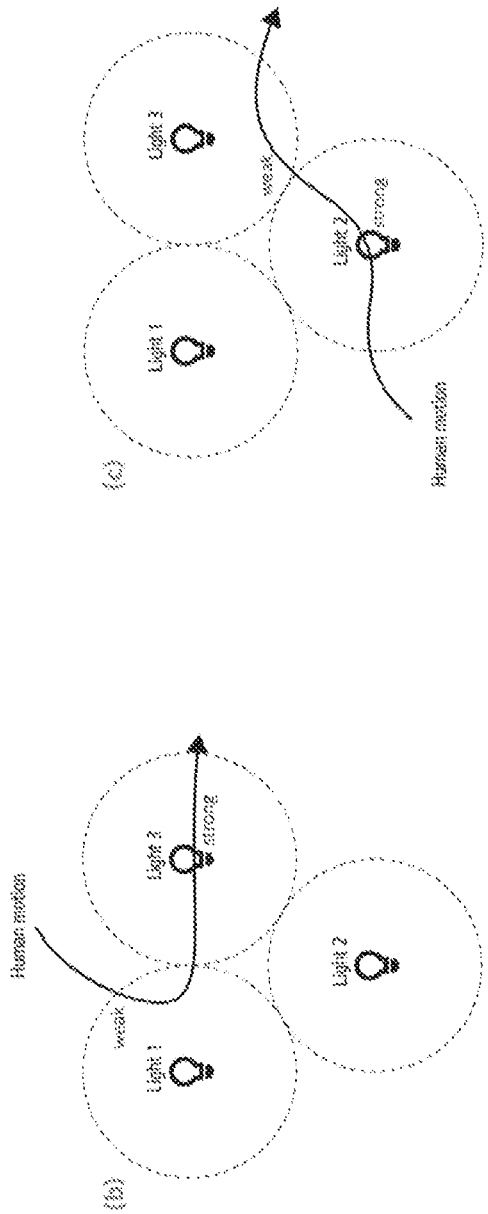
FIG. 12(a)-(c) are an illustrations showing a scenario with three lights is shown, where learning activities specifically for light 3 are examined. The required variables, stored in light 3, are listed in FIG. 12(a).

In FIG. 12(a)-(c) an illustrative embodiment is shown, wherein light-bulbs containing both an LED and a motion sensor is shown. In FIG. 12(b), weak motion near light 1 is shortly followed by strong motion near light 3, but not light 2.

The plurality of weights learned can be stored in a tentative library. If the number of times motion at a first sensor has been recorded exceeds a sampling threshold, all weights involving the first sensor can be deemed adequately sampled. This corresponding part of the weighted directed bipartite graph is transferred from the tentative library to the reference library. Motion at the first sensor can therefore lead to a predicted future behavior, as described in relation to FIG. 7.

In some embodiments, the sampling threshold is 1. In these embodiments the control system is quickly equipped with a weighted directed bipartite graph in the reference library, and can begin making predictions soon after installation. However, the low threshold means the weights are uncertain, and predictions are of low confidence.

In some embodiments, the sampling threshold is 1000. In these embodiments the control system is only much later equipped with a weighted directed bipartite graph in the reference library. The system can therefore have to rely on either manual operation or settings created during installation. However, once the threshold has been exceeded, the predictions of the inference engine can be of higher confidence.

In some embodiments, the sampling threshold is calibrated to a value that provides the control system with a learnt weighted directed bipartite graph in the reference library, but only if the wrong predictions of future partial behaviors are not worse than that the persons in the space are negatively impacted.

The learning method can continue to be executed as described and update the weighted directed bipartite graph in the tentative library. At regular intervals the reference library is updated with the content of the tentative library, such that changes to behavior becomes reflected in the reference library that is part of the control system operation.

In some embodiments, the tentative library can share the same memory as reference library and rules library. The plurality of data arrays are stored on the same volatile computer memory, or non-volatile computer memory, such as but not limited to a dynamic random-access memory, a static random-access memory, a flash memory, a floating gate device, a nitride read only memory. The different data arrays are distinguished by the unique memory address at which they are stored.

Figure 13:
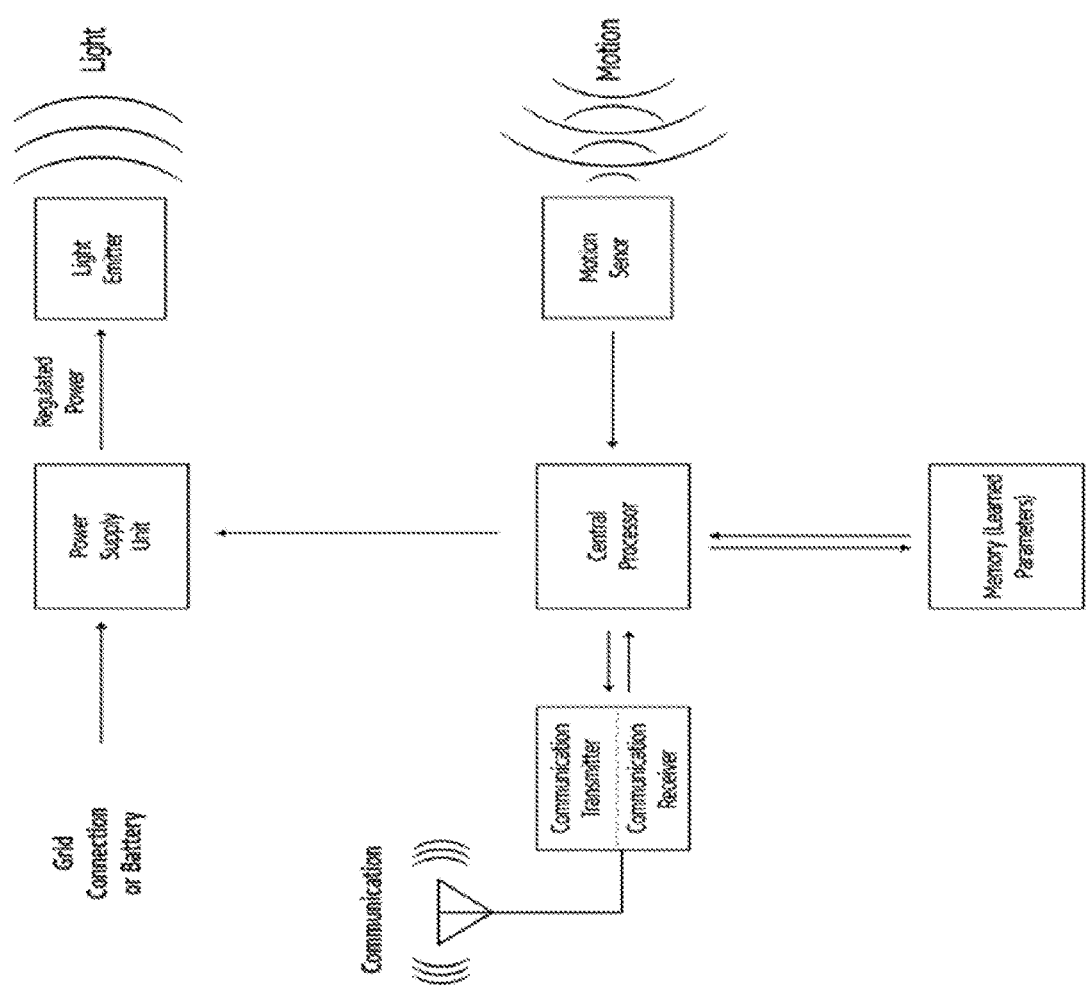
FIG. 13 is a diagram detailing the components of an intelligent lighting device capable of automatically turning itself on or off based on motion sensor signals from an on-board sensor as well as communicated motion data from neighbors, according to some embodiments.

In one embodiment of the system and its operation, the system is comprised of a plurality of dimmable LED luminaires. Within the housing of each dimmable LED luminaire, a motion sensor and an antenna are installed. In addition, there is a central processor and memory within the housing of each dimmable LED luminaire, see FIG. 13 for an illustrative embodiment. Therefore, each dimmable LED luminaire is capable of detecting local motion, capable of communicating the corresponding sensor data array through wireless transmission, and capable of executing the inference engine, rules engine, and logical commands and numerical evaluations to update the reference library and rules library, and the tentative association library.

In these embodiments different libraries use the same memory, and execution of different engines are performed with the same computer processor. Each LED luminaire can respond to behavior with little latency since few, if any, data arrays have to be transmitted and received over wireless couplings, or through couplings that rely on numerous intermediate devices.

Figure 14:
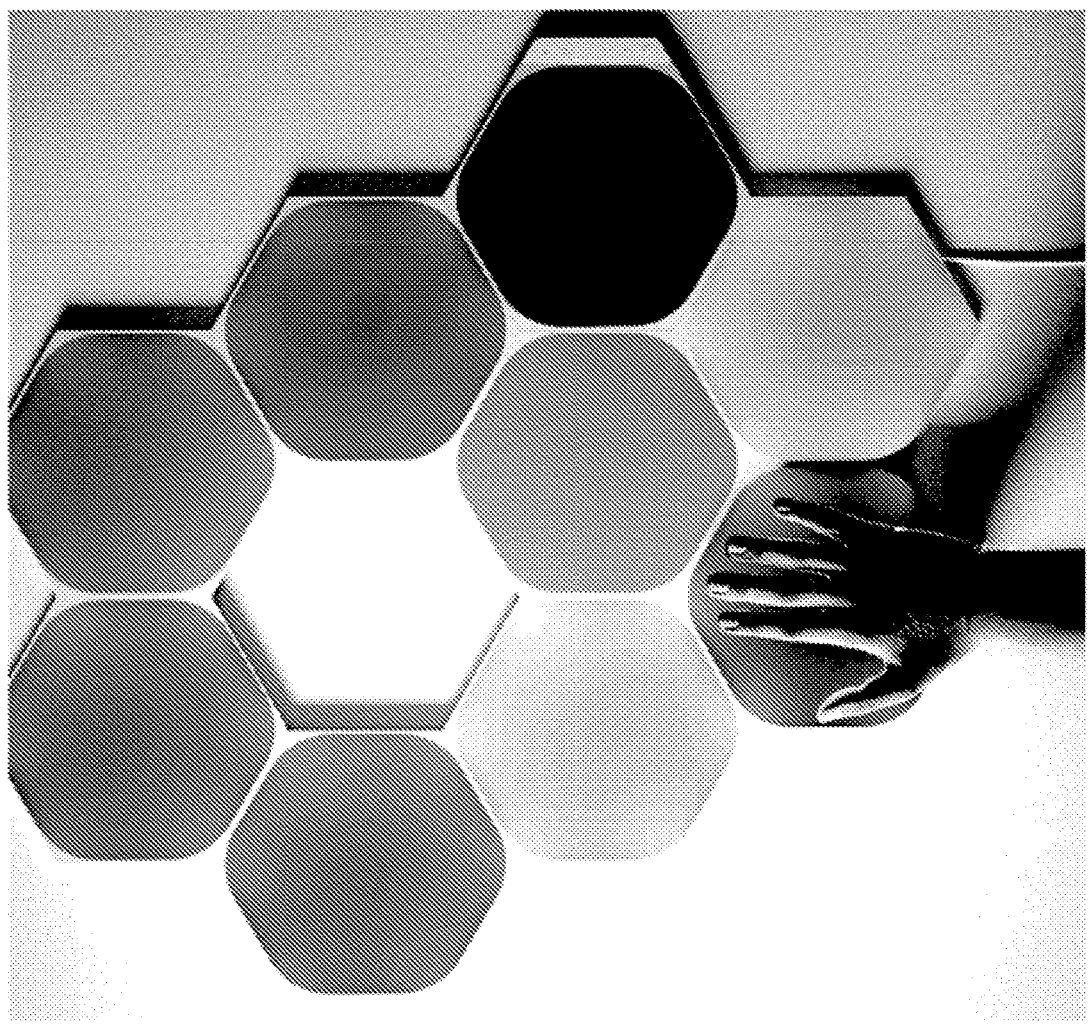
FIG. 14 is an example photograph of a plurality of flat-panel luminaires of hexagonal shape that are joined together by the sides, the luminaire comprising light-emitting components, sensors, digital memory, and processor, such that sensing, light actuation and inferences about behavior in the vicinity of the flat-panel luminaire can be performed with the luminaire. The sensors can include touch sensors, which interact with a hand at or near the luminaire.
Figure 15:
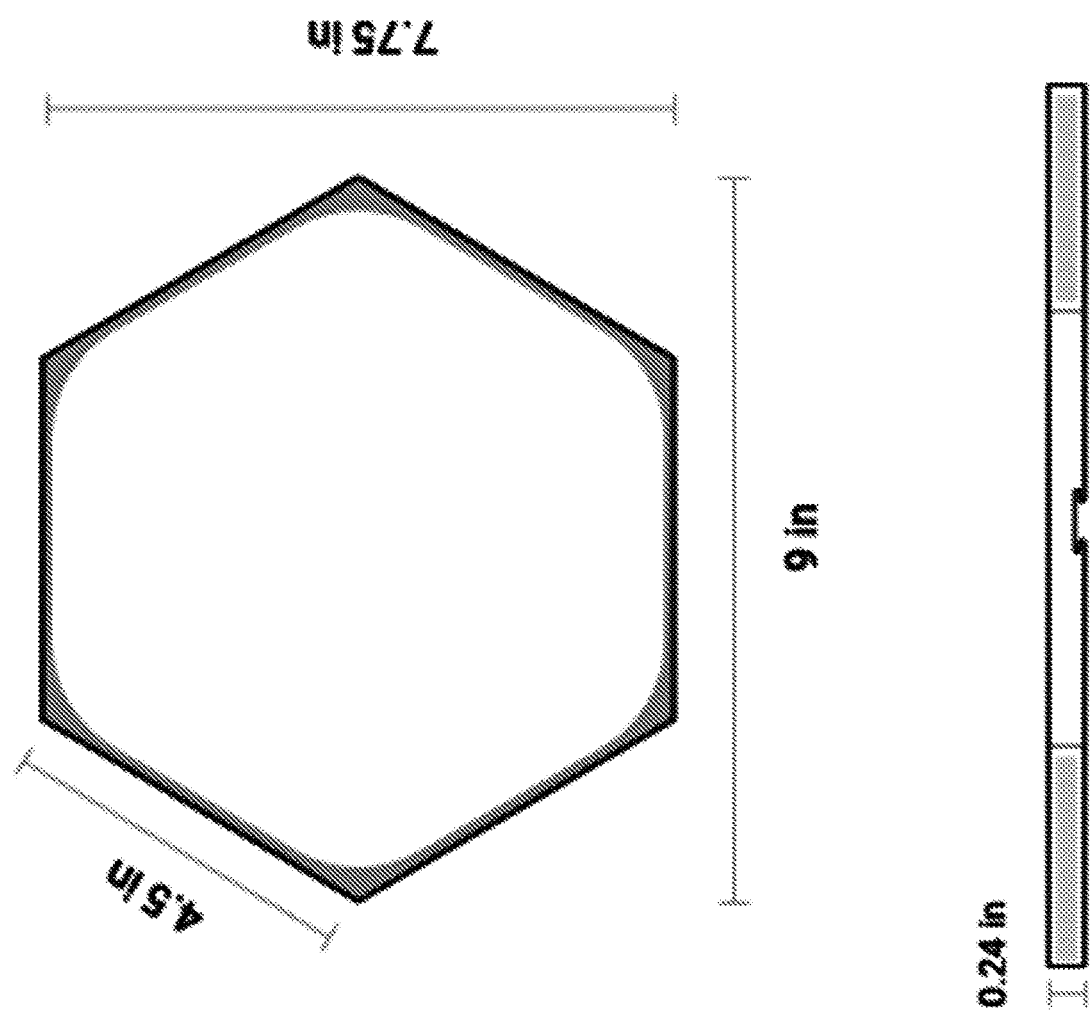
FIG. 15 are drawings of an illustrative flat-panel luminaire of hexagonal shape with dimensions. Not all embodiments are meant to be limited to such shapes and the illustrative luminaire is shown as an example of a controllable electronic device.

In some embodiments the housing of an LED luminaire with motion sensor, memory and processor, is in the shape of a standard light bulb, such as an A19 light bulb, or a PAR30, PAR38, MR16 directional lamp, or a T8, T12, T5 light tube. In some embodiments the housing the LED luminaire with motion sensor, memory and processor, is of an appreciably flat form factor and in a polygonal shape, such as an equilateral triangle, square, or hexagon, see FIG. 14 and FIG. 15. Other constructions of LED luminaires comprised of a plurality of sensors, memory and a processing unit can be contemplated.

Portable Remote Sensor System

A portable remote sensor, in some embodiments, is adapted for the automatic identification of nearby devices such that should be controlled by a remote switch. For example, an individual can walk into a room, actuate (e.g., press a button) on a remote that's on a table or glued to the wall, and nearby, and only nearby, electronic devices (e.g., lights) switch on, and all without any manual assignments of which lights should be associated with the remote through clumsy smartphone UIs, and most certainly without installing electrical wires in walls and ceiling. A challenge with alternate approaches is that often electronic devices need to be manually identified and entered into a control mechanism (e.g., the individual would have to set particular lights as being in the bedroom, hallway). This process can be time consuming and inefficient, and further prone to error.

An improved approach is described in some embodiments herein where the portable remote sensor can invoke a pre-programmed actuation sequence of the electronic devices. The pre-programmed actuation sequence is used in conjunction with a sensor embedded within or otherwise physically coupled to the remote portable device such that when particular actuations are sensed, only those electronic devices are coupled for control with the remote portable device, or, in another embodiment, a spatial relationship is stored to be tracked in a stored data array.

In the embodiments of the innovative control system and its learning that has been described so far, the spatial relations between sensors, between electronic devices, and between sensors and electronic devices, are not explicitly represented in a data array. The spatial quality of the behavior is implicit in the composite data array and how it is ordered along a time axis/dimension, and which motion patterns precede which actuation. For many applications this can be sufficient.

In some applications, however, it can be useful to be able to include in the plurality of logical commands a logical command that refers to a spatial relation between one or a plurality of sensors, and one or a plurality of electronic devices.

Figure 16:
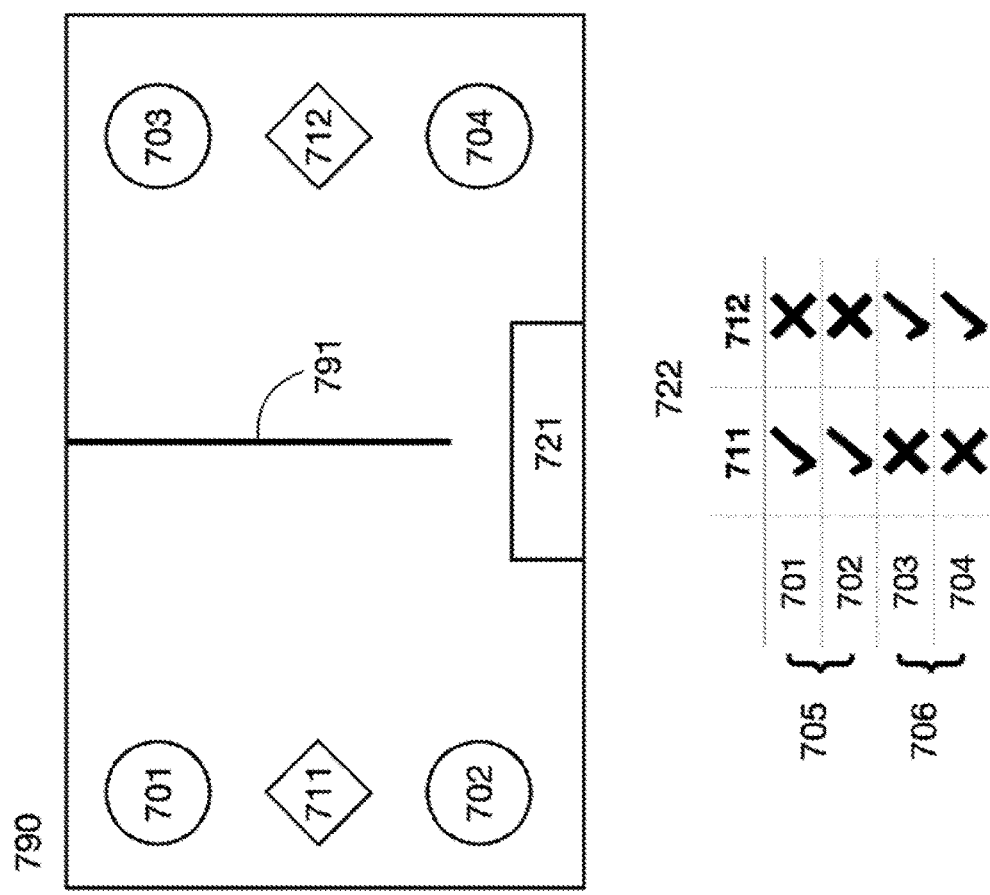
FIG. 16 is an illustration of a room with a wall and with stationary electronic devices and sensors, wherein the sensors can detect a percept in the neighborhood of an actuated electronic device.

A space 790 containing four electronic devices 701-704 and two sensors 711-712 is shown in FIG. 16. The plurality of sensors can detect if a nearby electronic device is actuated. The space contains a wall 791, such that the actuation of 701 and 702 cannot be detected by sensor 712, and such that the actuation of 703 and 704 cannot be detected by sensor 711.

The sensors and electronic devices are at least connected to a central controller 721, which can transmit data arrays to the electronic devices and which can receive data arrays from the sensors.

The central controller can execute the following logical commands. A data array is transmitted to the electronic device 701 instructing it to be actuated for a time interval, such as one millisecond, one second, or one minute. The actuation is detected by sensor 711, which it communicates as a sensor data array transmitted to the central controller. The central controller stores the association between electronic device 701 and sensor 711 in memory.

Next, the central controller transmits a data array to the electronic device 702 instructing it to be activated for a time interval. The actuation is detected by sensor 711, which it communicates as a sensor data array transmitted to the central controller. The central controller stores the association between electronic device and sensor 711.

Next, the central controller transmits a data array to electronic device 703 instructing it to be activated for a time interval. The actuation is detected by sensor 712, which it communicates as a sensor data array transmitted to the central controller. The central controller stores the association between electronic device 703 and sensor 712.

Next, the central controller transmits a data array to electronic device 704 instructing it to be activated for a time interval. The actuation is detected by sensor 712, which it communicates as a sensor data array transmitted to the central controller. The central controller stores the association between electronic device 704 and sensor 712.

At this stage, the central controller stores a data array 722 that represents all relations between sensors and electronic devices in the space. From the data array a natural grouping of the electronic devices follows, such that electronic devices and 702 can comprise an electronic device group 705. From the data array 722 a natural grouping of the electronic devices follows, such that electronic devices 703 and 704 can comprise an electronic device group 706.

Because the sensors detect an actuation in its vicinity, the groups contain spatial information, such that 701 and 702 are close to each other, and such that 703 and are close to each other. The spatial relation between sensors and electronic devices can also be obtained from the data array 722 stored by the central controller 721.

Grouping electronic devices and sensors can be useful in reducing the complexity of the control task. Rather than treating the actuation of a first electronic device as a distinct actuation event from the actuation of a second electronic device, the two actuation events can be merged into a single one, if the first electronic device and the second electronic device are in the same group. The control task can therefore entail the control of a reduced number of device groups rather than individual electronic devices.

In some embodiments a device group is comprised of a plurality of LED luminaires. As a group the plurality of LED luminaires can be switched on, switched off, dimmed up, dimmed down, and color tuned in concert. The rules engine can in these embodiments transmit an operational data array to all LED luminaires in the group.

In some embodiments, a device group is comprised of a plurality of HVAC devices. As a group the plurality of HVAC devices can be adjusted to increase ventilation flow rate, increase the electrical current, increase the flow of a refrigerant gas, or the converse decrease. The rules engine can in these embodiments transmit an operational data array to all HVAC devices in the group.

In some embodiments a device group is comprised of two or more pluralities of distinct types of devices, but which nonetheless can be operated in concert.

Although each device comprising the pluralities of device groups can be comprised of hardware and software, such that it can be operated as an individual unit, the grouping can reduce the complexity of the rules in the rules library. In some embodiments, there can be no behavior that is optimally associated with a change to the environment that involves control of only a single device in the plurality of devices in an electronic device group. In these embodiments the concerted control of the plurality of devices in an electronic device group is more useful to the person in the space.

Figure 17:
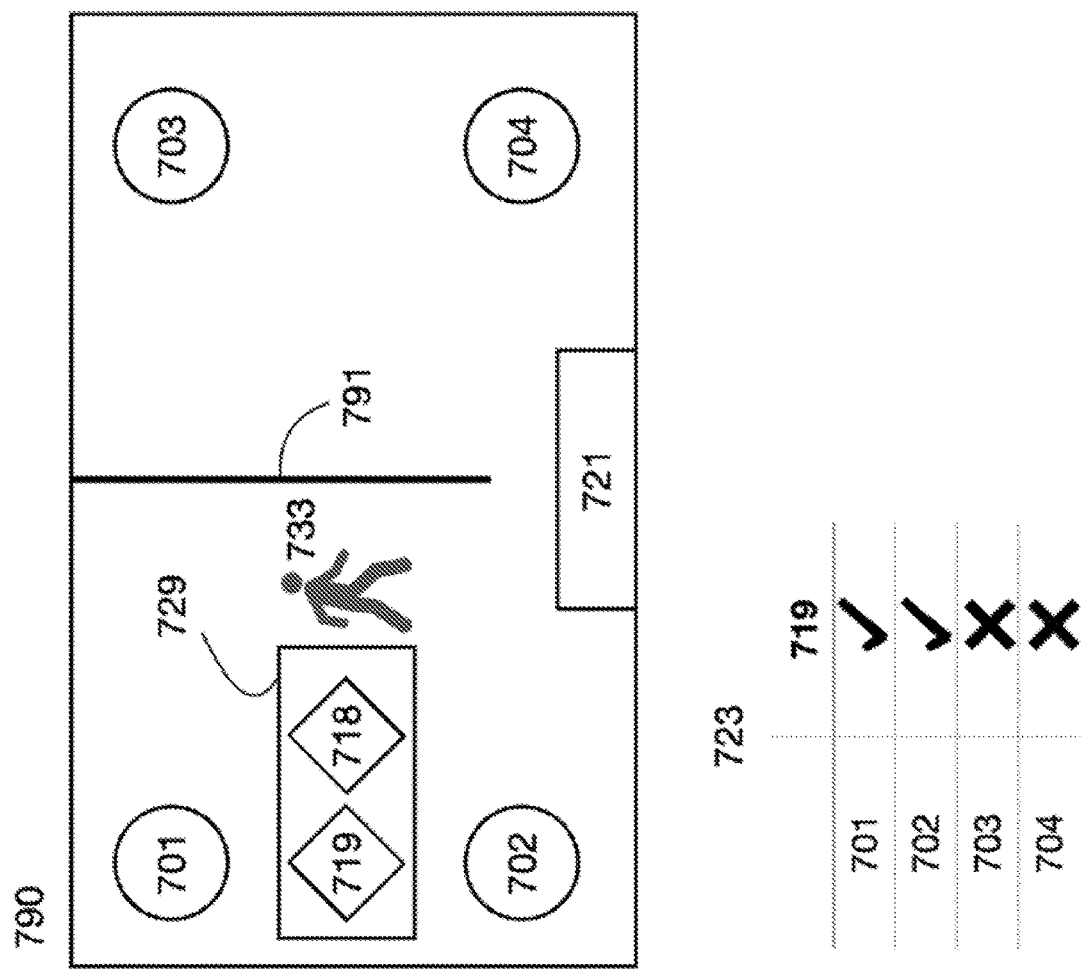
FIG. 17 is an illustration of a room with a wall and with stationary electronic devices and a portable remote sensor, wherein at least one sensor can detect a percept in the neighborhood of an actuated electronic device and at least one other sensor can detect input from a person operating the portable remote sensor.

In some embodiments the device group is dynamically defined relative a portable remote sensor 729, see FIG. 17. The portable remote sensor is not installed in a fixed location, rather it can be moved between rooms by a person 733 in the room.

In the illustrative embodiment in FIG. 17, the portable remote sensor is in the same room as electronic devices 701 and 702, however, it can be moved to be in the same room as electronic devices 703 and 704.

The portable remote sensor can be initialized to generate data array 723.

(1) The actuators 701-704 part of the system are first actuated in a pre-programmed sequence. For example, they could quickly switch on and off in the order 701 first, second, 703 third, 704 fourth. (2) The sensor 718 is during said sequence sensing for its percept, which is the output from 701-704. (3) The sensed signal of is aligned with the known pre-programmed sequence. If a signal is sensed at a time when the pre-programmed sequence is activating 701, then 718 is inferred to be close to 701. Conversely, if a signal is not sensed (or sensed below an intensity threshold), at a time when the pre-programmed sequence is activating 703, then 718 is inferred to be not close to 703. (4) These inferred spatial relations between 718 and the actuators 701-704 are stored in a data array 723.

The portable remote sensor 729 can be comprised of at least a first type of sensor and a second type of sensor 718. The first type of sensor 719 can detect and characterize the effect of an actuation event by one or a plurality of electronic devices 701-704 installed in the space and part of the control system. The proximity of the first sensor 719 to one or a plurality of the electronic devices 701-704 can be part of the characterization done by the sensor. In the embodiment in FIG. 17, that means that an actuation of 701 or 702 is detected, while an actuation of 703 or 704 is not detected.

The central controller can execute the following logical commands. A data array is transmitted to the electronic device 701 instructing it to be actuated for a time interval, such as one millisecond, one second, or one minute. The actuation is detected by sensor 719, which it communicates as a sensor data array transmitted to the central controller. The central controller stores the association between electronic device 701 and sensor 719 in memory.

A sequence of actuations of this nature are done, each actuation only for a time interval. The alignment of the plurality of sensor data arrays and the sequence of actuations can therefore classify each electronic device as a member of the neighborhood of sensor 719 or not, that is the spatial relation.

At this stage the central controller 721 stores a data array 723 that represents the spatial relation for sensor 719 and the electronic devices installed in the space 701-704. From the data array, a natural grouping follows of which electronic devices are in the neighborhood of the portable remote sensor 729.

In the illustrative embodiment, the other sensor 718 that is part of the portable remote sensor interacts with a percept. The percept can be caused by a behavior by the person in the space 733. This event can be encoded as a data array, which can be transmitted to the central controller. The two sensors of the portable remote sensor are by the design of the portable remote sensor spatially close. The stored data array is available to the central controller.

Therefore, a control system can infer from the execution of a syllogism that the behavior of the person took place close to a specific plurality of electronic devices. In the illustrative embodiment, the syllogism can be: (proposition 1) person 733 engaged in a behavior close to sensor 718, (proposition 2) sensor 718 is close to sensor 719, (proposition 3), sensor 719 is close to electronic devices 701 and 702, therefore, person 733 engaged in a behavior close to electronic devices 701 and Other syllogisms or logical commands can be contemplated.

The execution of the logical commands by an inference engine can therefore create a predicted partial behavior.

In a specific example, when the actuators 701-704 are luminaries, the sensor 718 is an ambient light sensor. Other variants are possible, however, in order for this approach to work well, the actuation of 701-704 has to lead to a change of the environment rather rapidly. Light is an excellent signal for this approach, while heat is not, since it diffuses slowly.

The rules engine can in turn associate the predicted partial behavior at the particular location near electronic devices 701 and 702 with a rule to actuate 701 and 702, but not 703 or 704. The control system has therefore associated a behavior in a spatial context within the room with an actuation event and hence a change of the environment. The portable remote sensor and the data array 723 it created, provides the inference engine with the information of the spatial context.

Accordingly, in this example, (1) the person 733 is engaged in some action in a room. For example, moving or pressing a button. (2) That action is sensed by a sensor that is part of a portable device placed inside the room. For example, 719 can be a motion sensor or a button. (3) Sensor 719 is known a priori to be close to sensor 718. The a priori relation can be a consequence of the manufacturing of the portable device and is not subject to alteration after assembly. (4) Sensor 718 is in a spatial relation to a plurality of actuators in the room 701-704 as described in a stored data array 723. For example, the spatial relation can be binary "close to"/"not close to". (5) Therefore, as person 733 is engaged in some action in a room, a subset of the actuators can be activated taking into account the spatial relation. For example, the person pressing the button on the portable device only switches on the lights that are close to the portable device, which in the illustrative embodiment is 701 and 702, but not 703 and 704.

Figure 18:
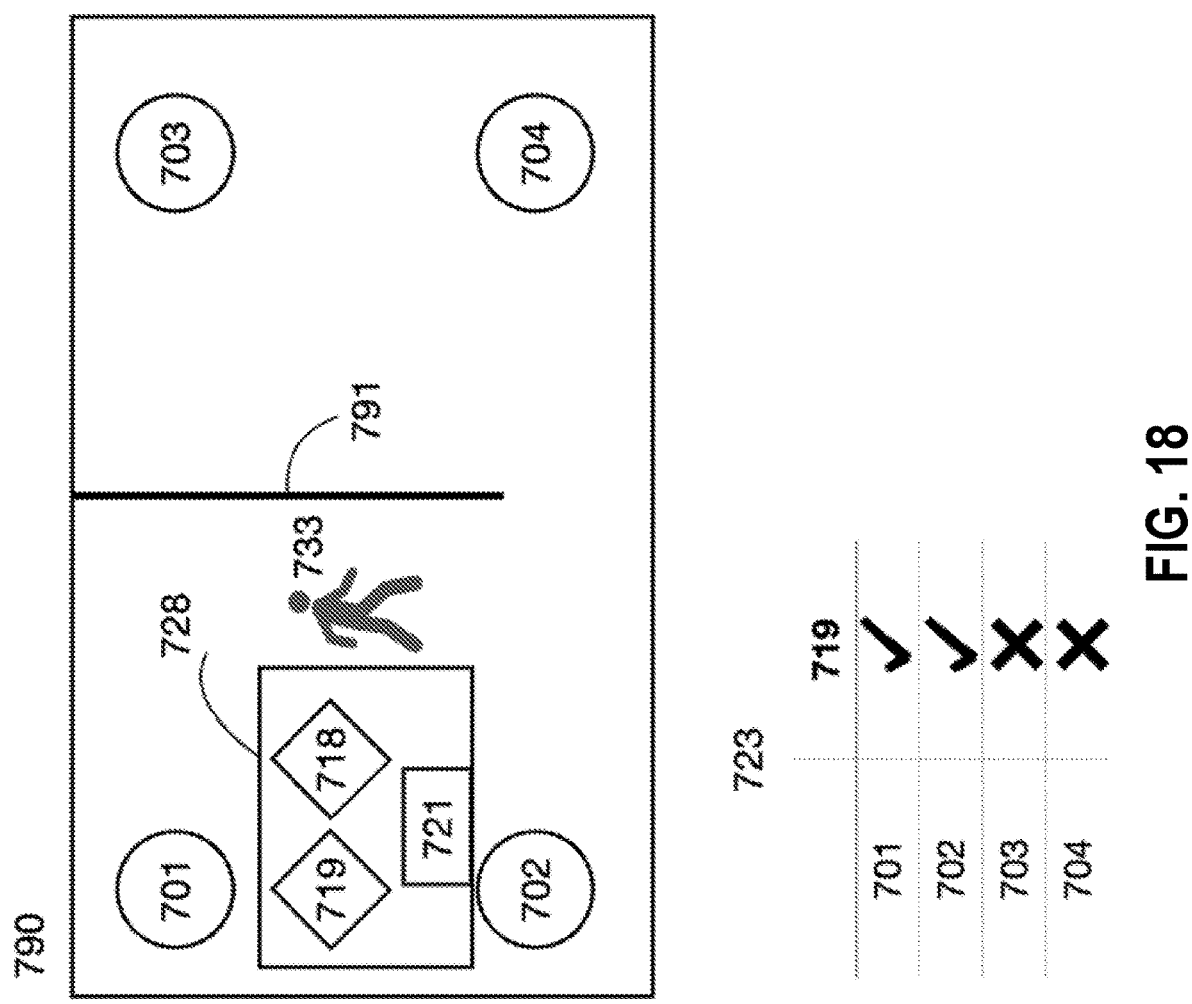
FIG. 18 is an illustration of a room with a wall and with stationary electronic devices and a portable remote sensor, wherein at least one sensor can detect a percept in the neighborhood of an actuated electronic device and at least one other sensor can detect input from a person operating the portable remote sensor. The portable remote sensor can furthermore create and transmit operational data arrays to the electronic devices and set their operational state.

In some embodiments the central controller 721 is contained within the housing of the portable remote sensor 728, see FIG. 18. The operation of the control system otherwise proceeds as described in relation to FIG. 17. The central controller can communicate data arrays with the sensors of the portable remote sensor through a wire or conductive trace rather than through a wireless connection.

In some embodiments the central controller 721 is contained within the housing of the portable remote sensor 728, and the portable remote sensor is physically attached to the body of person 733. The portable remote sensor can therefore be worn by the person.

In some embodiments the central controller updates the data array 723 that represents the relation for sensor 719 and the electronic devices installed in the space 701-704, at regular intervals, such as every one minute, every 10 minutes, every one hour.

In some embodiments the central controller updates the data array 723 that represents the elation for sensor 719 and the electronic devices installed in the space 701-704, if a button is pressed by the person 733. The button can part of the housing to the remote controller.

In some embodiments the central controller updates the data array 723 that represents the relation for sensor 719 and the electronic devices installed in the space 701-704, if a third type of sensor detects that the portable remote sensor is moving. The third type of sensor can be an accelerometer or a gyroscope that can detect and characterize motion or acceleration.

In some embodiments the sensor 719 that can detect and characterize an actuation event of the electronic devices 701-704 can be an ambient light sensor, and the electronic devices 701-704 can be LED luminaires. The light waves from the electronic devices that reach a detector surface of the sensor interact with a solid-state material with the property that charge is conducted only if light within a range of frequencies lands on said material. The conducted charge leads to a current, which can be embodied as a sensor data array. Because light travels fast, and because only a brief interaction of light with the solid-state material can be required, the control system can quickly determine the spatial context of the portable remote sensor. The duration of a spatial context determination can be one millisecond, 100 millisecond, 1 second, 10 seconds.

In some embodiments the sensor 719 that can detect and characterize an actuation event of the electronic devices 701-704 can be an antenna tuned to detect and characterize an electromagnetic wave of a set frequency. The frequency can be 2.4 gigahertz. The frequency can be 5 gigahertz. Other frequencies are possible. Because electromagnetic waves decrease in strength with distance travelled, the strength of the detected electromagnetic wave can be used to characterize the spatial distance between the sensor and the plurality of electronic devices.

In some embodiments the sensor 718 that can detect and characterize a behavior by the person, can be a switch that interacts with force applied by the person. The switch can interact with forces exerted by the person, either through gravitational pull towards a supporting surface like floor or seat, or by touching, pressing or twisting a component of a sensor. The switch can be a press button switch, rotary switch, slide switch, toggle switch, rocker switch, key lock switch, a combination of switches. The switch can be part of a touch screen. Other switch technology can be contemplated.

In some embodiments the sensor 718 that can detect and characterize a behavior by the person, can be a microphone that interacts with the mechanical air waves created by behaviors, such as spoken words, hand clapping, finger snapping, and walking on a hardwood floor. In case of spoken words, the sensor can be specific to sentences, such as "switch on the lights", "set lights to sunset mode", "lower the temperature a few degrees".

In some embodiments the sensor 718 that can detect and characterize a behavior by the person, can be a motion sensor that interacts with the variable motion of a person gesturing or walking.

In some embodiments the portable remote sensor is a smartphone. The sensors that are part of the smartphone can be programmed to perform the detections and characterizations as described above. In other embodiments the portable remote sensor is a wearable device, such as a smartwatch, smart wristband, smart eyeglasses, smart textile, or other device or material integrated with objects a person can wear, and which can be comprised of at least one sensor and a programmable integrated circuit to execute logical commands and numerical evaluations.

Figure 19:
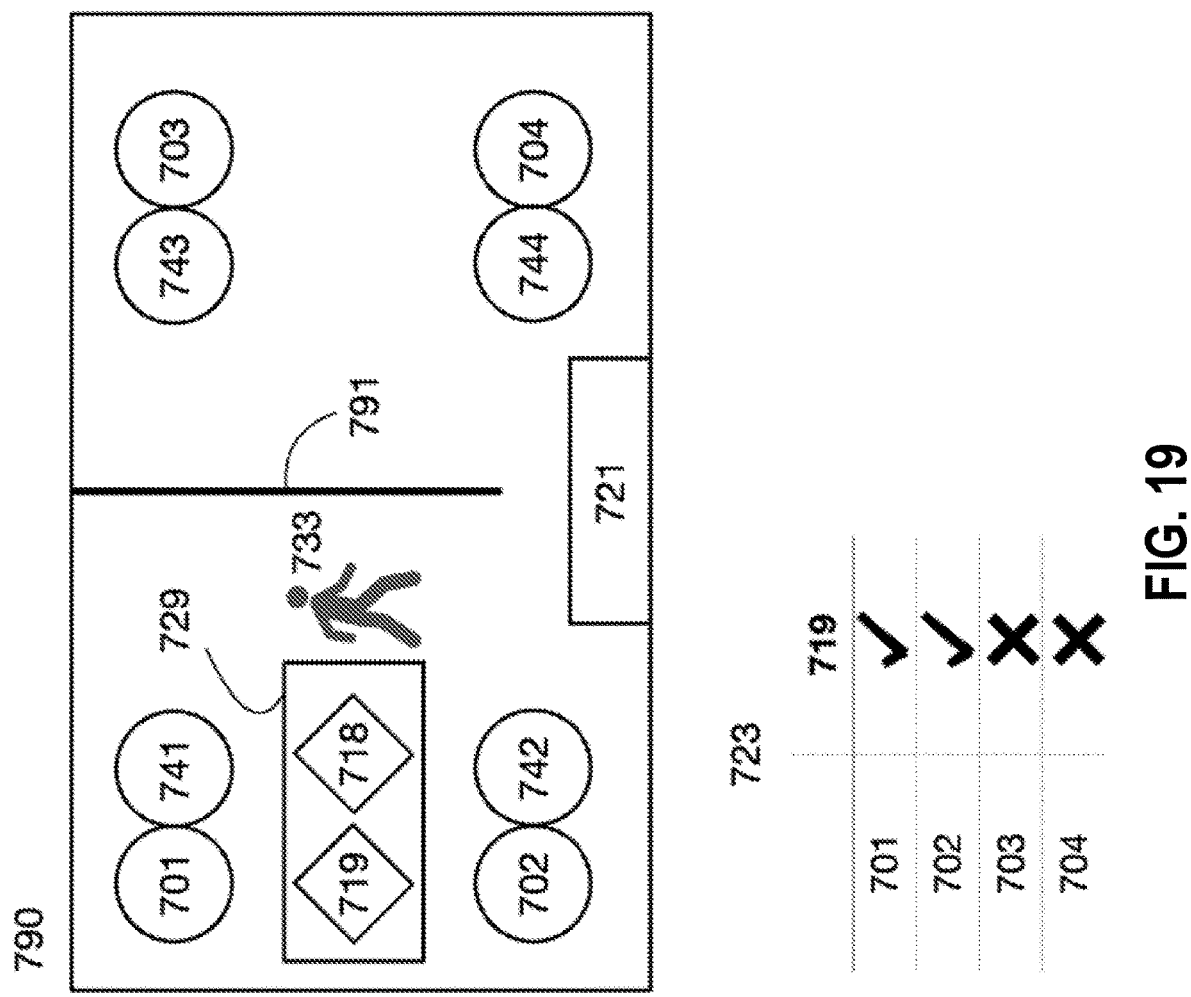
FIG. 19 is an illustration of a room with a wall and with stationary electronic devices and a portable remote sensor, wherein at least one sensor can detect a percept in the neighborhood of an actuated electronic device and at least one other sensor can detect input from a person operating the portable remote sensor. Each stationary electronic device can have a second type of electronic device in its neighborhood, such that the portable remote sensor being close to a specific stationary electronic device implies it is also close to a specific electronic device of the second type.

The control system can be comprised of additional electronic devices, which can be in a known spatial relation with other electronic devices, see FIG. 19(*a*)-(*c*). As in previous embodiments, a sensor 719 of the portable remote sensor can detect and characterize the actuation events of a plurality of electronic devices 701-704. The system is furthermore comprised of a second plurality of electronic devices 741-744. The first plurality of electronic devices can be in a known spatial relation to the second plurality of electronic devices. In the illustrative embodiment in FIG. 19, that relation is: 701 is close to 741; 702 is close to 742, 703 is close to 743, and 704 is close to 744. In some embodiments the two types of electronic devices are contained within the same housing.

The execution of logical commands in these embodiments can start out as in the previous embodiments in order to ascertain a spatial context of the portable remote sensor. The first type of sensor 719 can detect and characterize the effect of an actuation event by one or a plurality of electronic devices 701-704 installed in the space and part of the control system. The proximity of the first sensor 719 to one or a plurality of the electronic devices 701-704 can be part of the characterization done by the sensor. In the embodiment in FIG. 19(*a*)-(*c*), that means that an actuation of 701 or 702 is detected, while an actuation of 703 or 704 is not detected.

At this stage the central controller 721 stores a data array 723 that represents the relation for sensor 719 and the electronic devices installed in the space 701-704. From the data array follows a natural grouping of which electronic devices are in the neighborhood of the portable remote sensor 729.

In the illustrative embodiment, the other sensor 718 that is part of the portable remote sensor interacts with a percept. The percept can be caused by a behavior by the person in the space 733. This event can be encoded as a data array, which can be transmitted to the central controller. The two sensors of the portable remote sensor are by the design of the portable remote sensor spatially close. The stored data array is available to the central controller.

Therefore, a control system can infer from the execution of a syllogism that the behavior of the person took place close to a specific plurality of electronic devices. In the illustrative embodiment, the syllogism can be: (proposition 1) person 733 engaged in a behavior close to sensor 718, (proposition 2) sensor 718 is close to sensor 719, (proposition 3) sensor 719 is close to electronic devices 701 and 702, (proposition 4) the electronic devices 701 and 702 are close to the electronic devices and 742, respectively, therefore, person 733 engaged in a behavior close to electronic devices 741 and 742. Other syllogisms or logical commands can be contemplated.

The execution of the logical commands by an inference engine can therefore create a predicted partial behavior.

The rules engine can in turn associate the predicted partial behavior at the particular location near electronic devices 741 and 742 with a rule to actuate 741 and 742, but not 743 or 744. The control system has therefore associated a behavior in a spatial context within the room with an actuation event and hence a change of the environment. The portable remote sensor and the data array 723 it created, provides the inference engine with the information of the spatial context.

The two types of electronic devices, and the two types of sensors in the illustrative embodiment of FIG. 19 can perform distinct functions in the control system operation. The sensor 719 and the electronic devices 701-704 can perform a spatial context learning function. The portable remote sensor can therefore be characterized to be in a relative location to the plurality of spatial context electronic devices.

The sensor 718 and the electronic devices 741-744 can associate a behavior to a change of the environment through actuation. The combination of this function with the known spatial relation between the sensor 718 and 719, and the known spatial relation between the electronic devices 701-704 and 741-744, the spatial context of the behavior and the location of the actuation can be part of the association. In other words, a behavior can have a location in the space, and the response to said behavior can be spatially limited, wherein the spatial limits can be dynamically ascertained by the portable remote sensor.

The plurality of sensors and the plurality of electronic devices that can perform the spatial context learning function can be preferred to be rely on the quick transfer of a signal that has a limited range and that can be distinguished from other activities in the space.

A preferred signal can be a light wave emitted from an electronic device and detected by a light sensor. Light waves move quickly, and with decreasing strength as the distance from the light source and the light sensor increases. The light wave can furthermore be pulsed.

Figure 20:
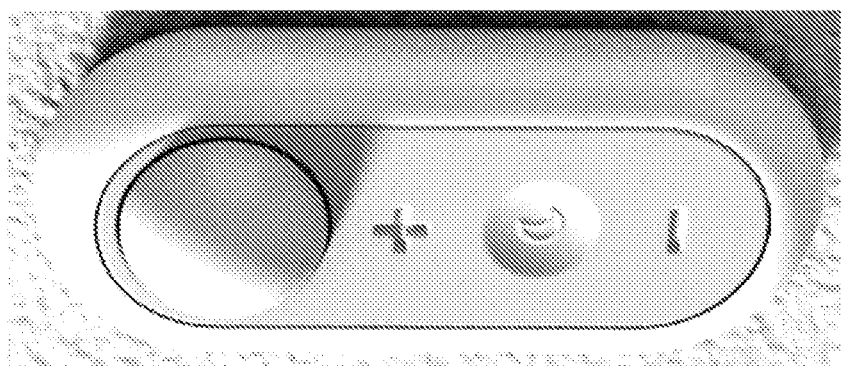
FIG. 20 is a photograph of an illustrative embodiment of a portable remote sensor comprised of a button and a light sensor.

An example of a portable remote sensor is shown in FIG. 20. The remote sensor is comprised of a button that can sense a force on the "+" symbol, a force on the "−" symbol, and a force on the crescent symbol. The sensor data array can be created to reflect how the button is pressed. The remote sensor is further comprised of a sensor within the hemispherical enclosure at the top of FIG. 20, which can sense light. The portable remote sensor in FIG. 20 can therefore be used to control luminaires locally to the portable remote sensor by operation as described in relation to FIG. 18.

Another preferred signal can be an electromagnetic wave, such as a radio wave, emitted from an electronic device and detected by a receiving antenna. Electromagnetic waves move quickly, and with decreasing strength as the distance from the transmitting electronic device and the receiving antenna increases. The electromagnetic wave can furthermore be pulsed.

A less suitable signal for an electronic device for spatial context learning is diffusion of heat from a heated radiator and detected by a temperature sensor, a thermometer. Heat diffuses slowly, and convection caused by directional air flow can make the spatial relation between heat source and thermometer vague.

What is claimed:

1. A method for the automatic operation of a plurality of electronic devices in a location,
    wherein the plurality of electronic devices are coupled to a first communication network, such that data arrays can be transmitted and received, and wherein the operation of an electronic device is changed or set by an operational data array,
    wherein a plurality of sensors in the space are coupled to a second communication network, such that data arrays can be transmitted and received, and wherein the sensor signal of a sensor is represented as a sensor data array,
    wherein a reference library stores a plurality of reference data arrays,
    the method comprising the steps of:
        constructing a composite data array of a plurality of sensor data arrays received within a time-interval over the second communication network from the plurality of sensors,
        evaluating a plurality of degrees of similarity of the composite data array to the plurality of reference data arrays in the reference library,
        predicting a future sensor data array or a plurality of future sensor data arrays to be equal to the reference data array, or the plurality of reference data arrays, with the highest degree of similarity in the evaluated plurality of degrees of similarity, unless there is an absence of a reference data array with a degree of similarity greater than a first threshold,
        associating the predicted future sensor data array or the plurality of future sensor data arrays with a first actuation of the plurality of electronic devices, and
        transmitting a plurality of operational data arrays over the first communication network to the plurality of electronic devices in accordance with the first actuation;
    wherein the plurality of sensors are comprised of a plurality of motion sensors, and the sensor data array is comprised of one or a plurality of values characteristic of the motion by one person or a plurality of persons within a distance of the plurality of motion sensors.

2. The method of claim 1, wherein the plurality of degrees of similarity of the composite data array to the plurality of reference data arrays in the reference library, are evaluated by comparison of a first partial sequence of the composite data array, and a second partial sequence of the reference data array, wherein the first and second partial sequences are locally aligned.

3. The method of claim 1, wherein the plurality of degrees of similarity of the composite data array to the plurality of reference data arrays in the reference library, are evaluated by comparison of a first compressed data array derived from the composite data array, and a compressed reference data array in the reference library.

4. The method of claim 1, wherein the step to associate the predicted future sensor data arrays or the predicted plurality of future sensor data arrays, is comprised of the steps: read from a rules library a key-value dictionary, and retrieve the value or plurality of values for which the predicted future sensor data array or the predicted plurality of future sensor data arrays is a key of the key-value dictionary.

5. The method of claim 1, wherein the plurality of electronic devices are comprised of a plurality of LED luminaires, and the operational data array is comprised of one or a plurality of electrical voltage or current values.

6. The method of claim 5, wherein the plurality of LED luminaires are color tunable, and the operational data array is comprised of one or a plurality of electrical current values for the distinctly colored light-emitting diodes comprising the color tunable LED luminaires.

7. The method of claim 1, wherein the plurality of values is comprised of ordered discrete levels that are proportional to the radial distance of the one person or the plurality of persons to the plurality of sensors.

8. The method of claim 1, wherein the plurality of values is comprised of ordered discrete levels that are proportional to the radial distance of the one person or the plurality of persons to the plurality of sensors, and discrete levels that denote the plurality of ranges of polar angles between the one person or the plurality of persons and the plurality of sensors.

9. The method of claim 1, wherein the plurality of electronic devices are comprised of a plurality of light switches, and the operational data array is comprised of one or a plurality of Boolean values.

10. The method of claim 1, wherein the plurality of electronic devices are comprised of a plurality of dimmer switches, and the operational data array is comprised of one or a plurality of percentage values.

11. The method of claim 1, wherein the plurality of sensors are comprised of a plurality of ambient light sensors, and the sensor data array is comprised of one or a plurality of values characteristic of the ambient light present in the location.

12. The method of claim 1, wherein the sensors of the plurality of sensors are low resolution sensors that cannot resolve personally-identifiable information of the individual or a plurality of individuals in the location.

13. The method of claim 1, wherein the time-interval is 10 seconds prior to the present moment, or wherein the time-interval is 1 hour prior to the present moment.

14. The method of claim 1, wherein the plurality of electronic devices are comprised of HVAC devices, and the operational data array is comprised of one or a plurality of indoor climate variables, such as temperature, humidity, air circulation.

15. The method of claim 1, wherein the plurality of electronic devices are comprised of an Internet connected device that can transmit an informative message or a warning message to a device remote from the space.

16. The method of claim 1, wherein the plurality of sensors are comprised of a plurality of switches, and the sensor data array is comprised of one or a plurality of values corresponding to how the plurality of switches are set.

17. The method of claim 1, wherein the plurality of electronic devices and the plurality of sensors are situated within a plurality of shared housings, such that each housing contains at least one electronic device and at least one sensor.

18. The method of claim 17, wherein the shared housing and its interior components comprises a luminaire.

19. The method of claim 1, wherein the location is a single room in a dwelling or office, or wherein the location is a plurality of connected rooms in a dwelling or office.

\* \* \* \* \*